(12) United States Patent
Zhou et al.

(10) Patent No.: US 12,082,283 B2
(45) Date of Patent: Sep. 3, 2024

(54) LOWER LAYER BEAM FAILURE INDICATORS FOR WIRELESS COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Aleksandar Damnjanovic, Del Mar, CA (US); Junyi Li, Franklin Park, NJ (US); Juan Montojo, San Diego, CA (US); Tao Luo, San Diego, CA (US); Olufunmilola Omolade Awoniyi-Oteri, San Diego, CA (US); Sony Akkarakaran, Poway, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/241,005

(22) Filed: Apr. 26, 2021

(65) Prior Publication Data

US 2022/0346172 A1    Oct. 27, 2022

(51) Int. Cl.
*H04W 76/18*    (2018.01)
*H04L 5/00*    (2006.01)
*H04W 24/08*    (2009.01)

(52) U.S. Cl.
CPC .......... *H04W 76/18* (2018.02); *H04L 5/0048* (2013.01); *H04W 24/08* (2013.01)

(58) Field of Classification Search
CPC ...... H04W 76/18; H04W 24/08; H04L 5/0048
See application file for complete search history.

(56) References Cited

U.S. PATENT DOCUMENTS

| | | | |
|---|---|---|---|
| 2019/0253941 A1* | 8/2019 | Cirik | H04W 36/08 |
| 2019/0253986 A1* | 8/2019 | Jeon | H04W 72/042 |
| 2021/0028853 A1* | 1/2021 | Wu | H04W 16/28 |
| 2021/0194756 A1* | 6/2021 | Babaei | H04L 41/0654 |
| 2021/0234601 A1* | 7/2021 | Awadin | H04L 5/0048 |
| 2022/0021476 A1* | 1/2022 | Mo | H04L 1/0026 |
| 2022/0159484 A1* | 5/2022 | Matsumura | H04B 7/088 |

* cited by examiner

*Primary Examiner* — Peter P Chau
(74) *Attorney, Agent, or Firm* — QUALCOMM Incorporated

(57) ABSTRACT

Methods, systems, and devices for wireless communications are described. In some wireless communications systems, a user equipment (UE) may receive, from a base station, a configuration indicating a channel quality threshold that the UE may use to identify an interference-based beam failure indicator type. The UE may receive a reference signal for performing one or more signal measurements in accordance with the configuration. Based on the one or more signal measurements and the channel quality threshold, the UE may report an indication of the type of beam failure indicator to the base station.

30 Claims, 17 Drawing Sheets

LOWER LAYER BEAM FAILURE INDICATORS FOR WIRELESS COMMUNICATIONS

FIELD OF TECHNOLOGY

The following relates to wireless communications, including lower layer beam failure indicators (BFI) for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may implement beamforming to facilitate data transmission between devices. In some cases, however, communications quality in such beamformed systems may be reduced, and beam failure may occur.

SUMMARY

The described techniques relate to improved methods, systems, devices, and apparatuses that support lower layer beam failure indicators (BFI) for wireless communications. Generally, the described techniques provide support for BFI and beam failure reporting between devices in a wireless system. Wireless devices such as a user equipment (UE) and base station may exchange data using beamformed communications in a high frequency wireless communications network. In some cases, however, poor channel quality or instantaneous interference may cause beam failure. The UE may in some cases receive a configuration which includes one or more channel quality thresholds that the UE may use to identify a BFI type for further beam failure detection within the UE or to report to the base station. The UE may receive a reference signal with which to perform signal measurements in accordance with the configuration, and based on the signal measurements and the channel quality thresholds, the UE may report a BFI (e.g., to a higher layer or to the base station). In some cases, the UE may report a first BFI based on a measured signal to interference plus noise ratio (SINR) of the beam being less than a threshold SINR, indicating poor channel quality. In some other cases, the UE may report a second BFI based on the comparison of various other channel quality measurements to one or more of thresholds configured for the UE, which may indicate channel or beam interference (e.g., interference caused by physical blockage, other UEs in the serving cell, by different transmitting panels of the UE, etc.).

A method for wireless communications at a UE is described. The method may include receiving, from a base station, a configuration indicating a channel quality threshold for determining a type of BFI to be an interference-based BFI, receiving, from the base station, a reference signal for performing one or more signal measurements in accordance with the configuration, and reporting an indication of the type of BFI, where the type of BFI is based on the one or more signal measurements and the channel quality threshold.

An apparatus for wireless communications at a UE is described. The apparatus may include a processor, memory coupled with the processor, and instructions stored in the memory. The instructions may be executable by the processor to cause the apparatus to receive, from a base station, a configuration indicating a channel quality threshold for determining a type of BFI to be an interference-based BFI, receive, from the base station, a reference signal for performing one or more signal measurements in accordance with the configuration, and report an indication of the type of BFI, where the type of BFI is based on the one or more signal measurements and the channel quality threshold.

Another apparatus for wireless communications at a UE is described. The apparatus may include means for receiving, from a base station, a configuration indicating a channel quality threshold for determining a type of BFI to be an interference-based BFI, means for receiving, from the base station, a reference signal for performing one or more signal measurements in accordance with the configuration, and means for reporting an indication of the type of BFI, where the type of BFI is based on the one or more signal measurements and the channel quality threshold.

A non-transitory computer-readable medium storing code for wireless communications at a UE is described. The code may include instructions executable by a processor to receive, from a base station, a configuration indicating a channel quality threshold for determining a type of BFI to be an interference-based BFI, receive, from the base station, a reference signal for performing one or more signal measurements in accordance with the configuration, and report an indication of the type of BFI, where the type of BFI is based on the one or more signal measurements and the channel quality threshold.

Some examples of the method, apparatuses, and non-transitory computer-readable medium described herein may further include operations, features, means, or instructions for receiving an indication of a second channel quality threshold, the channel quality threshold including a SINR threshold and the second channel quality threshold including a signal to noise ratio (SNR) threshold, where the type of BFI may be determined based on the first and second channel quality thresholds.

In some examples of the method, apparatuses, and non-transitory computer-readable medium described herein, the one or more signal measurements includes a SINR measurement of the reference signal and a SNR measurement of the reference signal and the method, apparatuses, and non-transitory computer-readable medium may include further operations, features, means, or instructions for determining that the BFI may be the interference-based BFI based on the SINR measurement of the reference signal being less than the SINR threshold and the SNR measurement of the reference signal being greater than the SNR threshold and determining that the BFI may be a channel-based BFI based on the SINR measurement of the reference signal being less than the SINR threshold and the SNR measurement of the reference signal being less than the SNR threshold.

Some examples of the method, apparatuses, and non-transitory computer-readable medium described herein may further include operations, features, means, or instructions for receiving an indication of a second channel quality threshold, the channel quality threshold including a SINR threshold and the second channel quality threshold including a signal difference threshold, where the type of BFI may be determined based on the first and second channel quality thresholds.

In some examples of the method, apparatuses, and non-transitory computer-readable medium described herein, the one or more signal measurements includes a SINR measurement of the reference signal and a SNR measurement of the reference signal and the method, apparatuses, and non-transitory computer-readable medium may include further operations, features, means, or instructions for determining that the BFI may be the interference-based BFI based on the SINR measurement of the reference signal being less than the SINR threshold and a difference between the SINR measurement of the reference signal and the SNR measurement of the reference signal being greater than the signal difference threshold and determining that the BFI may be a channel-based BFI based on the SINR measurement of the reference signal being less than the SINR threshold and the difference between the SINR measurement of the reference signal and the SNR measurement of the reference signal being less than the signal difference threshold.

Some examples of the method, apparatuses, and non-transitory computer-readable medium described herein may further include operations, features, means, or instructions for receiving an indication of a second channel quality threshold, the channel quality threshold including a SINR threshold and the second channel quality threshold including a filter difference threshold, where the type of BFI may be determined based on the first and second channel quality thresholds.

In some examples of the method, apparatuses, and non-transitory computer-readable medium described herein, the one or more signal measurements includes a SINR measurement of the reference signal and an average SINR measurement of the reference signal and the method, apparatuses, and non-transitory computer-readable medium may include further operations, features, means, or instructions for determining that the BFI may be the interference-based BFI based on the SINR measurement of the reference signal being less than the SINR threshold and a difference between the SINR measurement of the reference signal and the average SINR measurement of the reference signal being greater than the filter difference threshold and determining that the BFI may be a channel-based BFI based on the SINR measurement of the reference signal being less than the SINR threshold and the difference between the SINR measurement of the reference signal and the average SINR measurement of the reference signal being less than the filter difference threshold.

Some examples of the method, apparatuses, and non-transitory computer-readable medium described herein may further include operations, features, means, or instructions for receiving an indication of a second channel quality threshold, the channel quality threshold including a SINR threshold and the second channel quality threshold including a pathloss threshold, where the type of BFI may be determined based on the first and second channel quality thresholds.

In some examples of the method, apparatuses, and non-transitory computer-readable medium described herein, the one or more signal measurements includes a SINR measurement of the reference signal and a pathloss of the reference signal and the method, apparatuses, and non-transitory computer-readable medium may include further operations, features, means, or instructions for determining that the BFI may be the interference-based BFI based on the SINR measurement of the reference signal being less than the SINR threshold and the pathloss of the reference signal being less than the pathloss threshold and determining that the BFI may be a channel-based BFI based on the SINR measurement of the reference signal being less than the SINR threshold and the pathloss of the reference signal greater less than the pathloss threshold.

In some examples of the method, apparatuses, and non-transitory computer-readable medium described herein, the pathloss of the reference signal may be indicated by a reference signal received power (RSRP) measurement or a channel quality indicator (CQI) report.

In some examples of the method, apparatuses, and non-transitory computer-readable medium described herein, receiving the reference signal may include operations, features, means, or instructions for receiving a beam failure detection reference signal from the base station.

In some examples of the method, apparatuses, and non-transitory computer-readable medium described herein, the beam failure detection reference signal may be specific to one of the interference-based BFI or the channel-based BFI.

In some examples of the method, apparatuses, and non-transitory computer-readable medium described herein, the beam failure detection reference signal instructs the UE to measure one or more parameters for determining one of the interference-based BFI or the channel-based BFI.

Some examples of the method, apparatuses, and non-transitory computer-readable medium described herein may further include operations, features, means, or instructions for transmitting, to the base station, a report including a count of BFIs at the UE, the count of BFIs corresponding to a beam associated with the BFI or all beams configured for the UE.

In some examples of the method, apparatuses, and non-transitory computer-readable medium described herein, the report may be transmitted via uplink control information or a medium access control (MAC) control element (MAC-CE).

In some examples of the method, apparatuses, and non-transitory computer-readable medium described herein, receiving the configuration may include operations, features, means, or instructions for receiving the configuration via a radio resource control (RRC) message, downlink control information, a MAC-CE, or any combination thereof.

A method for wireless communications at a base station is described. The method may include transmitting, to a UE, a configuration indicating a channel quality threshold for determining a type of BFI to be an interference-based BFI, transmitting, to the UE, a reference signal for the UE to perform one or more signal measurements in accordance with the configuration, and receiving, from the UE, an indication of a BFI at the UE, the BFI corresponding to one or more beams of the UE.

An apparatus for wireless communications at a base station is described. The apparatus may include a processor, memory coupled with the processor, and instructions stored in the memory. The instructions may be executable by the processor to cause the apparatus to transmit, to a UE, a configuration indicating a channel quality threshold for determining a type of BFI to be an interference-based BFI, transmit, to the UE, a reference signal for the UE to perform one or more signal measurements in accordance with the configuration, and receive, from the UE, an indication of a BFI at the UE, the BFI corresponding to one or more beams of the UE.

Another apparatus for wireless communications at a base station is described. The apparatus may include means for transmitting, to a UE, a configuration indicating a channel quality threshold for determining a type of BFI to be an interference-based BFI, means for transmitting, to the UE, a reference signal for the UE to perform one or more signal measurements in accordance with the configuration, and means for receiving, from the UE, an indication of a BFI at the UE, the BFI corresponding to one or more beams of the UE.

A non-transitory computer-readable medium storing code for wireless communications at a base station is described. The code may include instructions executable by a processor to transmit, to a UE, a configuration indicating a channel quality threshold for determining a type of BFI to be an interference-based BFI, transmit, to the UE, a reference signal for the UE to perform one or more signal measurements in accordance with the configuration, and receive, from the UE, an indication of a BFI at the UE, the BFI corresponding to one or more beams of the UE.

Some examples of the method, apparatuses, and non-transitory computer-readable medium described herein may further include operations, features, means, or instructions for transmitting an indication of a second channel quality threshold, the channel quality threshold including a SINR threshold and the second channel quality threshold including a SNR threshold, where the indication of the BFI at the UE may be based on the first and second channel quality thresholds.

Some examples of the method, apparatuses, and non-transitory computer-readable medium described herein may further include operations, features, means, or instructions for transmitting an indication of a second channel quality threshold, the channel quality threshold including a SINR threshold and the second channel quality threshold including a signal difference threshold, where the indication of the BFI at the UE may be based on the first and second channel quality thresholds.

Some examples of the method, apparatuses, and non-transitory computer-readable medium described herein may further include operations, features, means, or instructions for transmitting an indication of a second channel quality threshold, the channel quality threshold including a SINR threshold and the second channel quality threshold including a filter difference threshold, where the indication of the BFI at the UE may be based on the first and second channel quality thresholds.

Some examples of the method, apparatuses, and non-transitory computer-readable medium described herein may further include operations, features, means, or instructions for transmitting an indication of a second channel quality threshold, the channel quality threshold including a SINR threshold and the second channel quality threshold including a pathloss threshold, where the indication of the BFI at the UE may be based on the first and second channel quality thresholds.

In some examples of the method, apparatuses, and non-transitory computer-readable medium described herein, transmitting the reference signal may include operations, features, means, or instructions for transmitting a beam failure detection reference signal to the UE.

In some examples of the method, apparatuses, and non-transitory computer-readable medium described herein, the beam failure detection reference signal may be specific to one of the interference-based BFI or a channel-based BFI.

In some examples of the method, apparatuses, and non-transitory computer-readable medium described herein, the beam failure detection reference signal instructs the UE to measure one or more parameters for determining the type of BFI to be one of the interference-based BFI or a channel-based BFI.

In some examples of the method, apparatuses, and non-transitory computer-readable medium described herein, receiving the indication of the BFI may include operations, features, means, or instructions for receiving, from the UE, a report including a count of BFIs at the UE, the count of BFIs corresponding to a beam associated with the BFI or all beams configured for the UE.

In some examples of the method, apparatuses, and non-transitory computer-readable medium described herein, the report may be received via uplink control information or a MAC-CE.

In some examples of the method, apparatuses, and non-transitory computer-readable medium described herein, transmitting the configuration may include operations, features, means, or instructions for transmitting the configuration via an RRC message, downlink control information, a MAC-CE, or any combination thereof.

DETAILED DESCRIPTION

Figure 1:
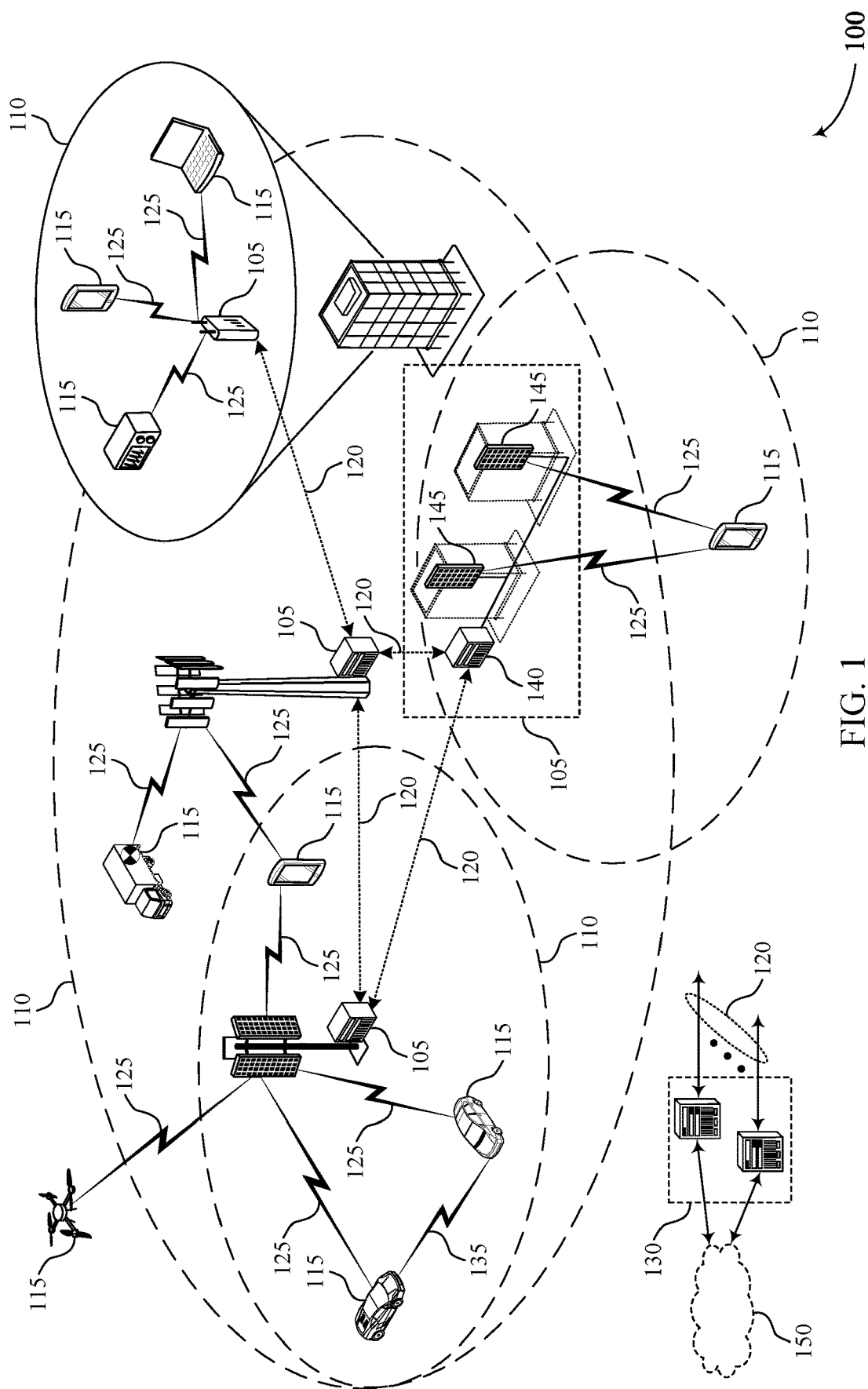
FIG. 1 illustrates an example of a wireless communications system that supports lower layer beam failure indicators (BFI) for wireless communications in accordance with aspects of the present disclosure.

Wireless communications at high frequencies (e.g., millimeter wave (mmW) frequencies) may be associated with increased signal attenuation (e.g., path loss) and poor channel quality due to various factors such as temperature, barometric pressure, diffraction, etc. In addition, transmissions between wireless devices operating at high frequencies may experience temporary interference from physical obstructions such as physical barriers or blockages. Some wireless communications systems may support beam failure mitigation techniques that wireless devices may implement to attempt to mitigate beam failure. In some cases, however, beam failure mitigation may be insufficient to overcome poor channel quality or temporary interference, resulting in beam failure. In such cases, a device such as a user equipment (UE) may report one or more beam failure indicators (BFI) (e.g., a first BFI type) to a base station, and when the number of BFI exceeds a threshold, beam failure may be declared to initiate a beam failure recovery procedure.

To determine whether to report the first BFI type, however, the UE may rely solely on signal to interference plus noise ratio (SINR) measurements of the beam, and the UE may be unable distinguish between a BFI associated with insufficient channel quality and a BFI associated with temporary interference. For example, in some cases, the beam failure (or a reported BFI) caused by temporary interference may resolve itself in a short amount of time relative to the amount of time it would take to perform a full beam reselection procedure.

To reduce the number of beam failure reselection procedures and to better categorize BFI type, in some cases the UE may report a second BFI type (e.g., BFI interference) which is associated with instantaneous or temporary interference identified for a beam. For example, the base station may configure the UE with one or more thresholds (e.g., via radio resource control (RRC) signaling) which correspond to different channel quality and interference strength measurements for a beam. The UE may compare various channel quality measurements to the thresholds to evaluate channel and interference strength in addition to the conventional SINR measurements used for the first BFI type. For example, a first threshold may be a signal to noise (SNR) threshold. If the UE determines that SINR is low for a given beam measurement (e.g., below an SINR threshold), and SNR is also lower than the SNR threshold, the UE may report the second BFI type for the beam. A second threshold may be configured for a difference between SNR and SINR, such that if a determined difference (e.g., SNR-SINR) for a beam is greater than the threshold, the UE may report the second BFI type. A third threshold may be a filtering difference threshold, such that if the difference between a long term filter measurement and a short term filter measurement is less than a threshold filter difference, then the UE may report the second BFI type. A fourth threshold may be a pathloss threshold, such that if a measured pathloss for the beam is less than the threshold pathloss, the UE may report the second BFI type.

Aspects of the disclosure are initially described in the context of wireless communications systems and a process flow. Aspects of the disclosure are further illustrated by and described with reference to apparatus diagrams, system diagrams, and flowcharts that relate to lower layer BFIs for wireless communications.

FIG. 1 illustrates an example of a wireless communications system 100 that supports lower layer BFIs for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless devices such as UE 115 and base station 105 may exchange data using beamformed communications in a high frequency wireless communications network such as wireless communications network 100. In some cases, however, channel quality or instantaneous interference may cause beam failure. The UE 115 may in some cases report a first BFI based on a measured SINR of the beam being less than a threshold SINR, indicating poor channel quality. In some other cases, the UE 115 may report a second BFI based on the comparison of various other channel quality measurements to a number of thresholds configured for the UE 115 indicating instantaneous or temporary channel interference. In some cases, the second BFI type may allow the UE 115 to refrain from performing a full beam reselection or beam recovery procedure (e.g., as opposed to BFI type 1, which may prompt a full beam selection or beam recovery procedure). Thus, reporting BFI type 2 may reduce power expenditure and allow the UE 115 to better characterize the BFI type.

The base station 105 may configure the UE 115 with one or more thresholds (e.g., via RRC signaling) which correspond to different channel quality and interference strength measurements for the beam. For example, a first threshold may be a SNR threshold. If the UE 115 determines that SINR is low for a given beam measurement, and SNR is also lower than the SNR threshold, the UE 115 may report the second BFI type for the beam. A second threshold may be configured for a difference between SNR and SINR, such that if a determined difference (e.g., SNR-SINR) for a beam is greater than the threshold, the UE 115 may report the second BFI type. A third threshold may be a filtering difference threshold, such that if the difference between a long term filter measurement and a short term filter measurement is less than a threshold filter difference, then the UE 115 may report the second BFI type. A fourth threshold may be a pathloss threshold, such that if a measured pathloss for the beam is less than the threshold pathloss, the UE 115 may report the second BFI type.

Figure 2:
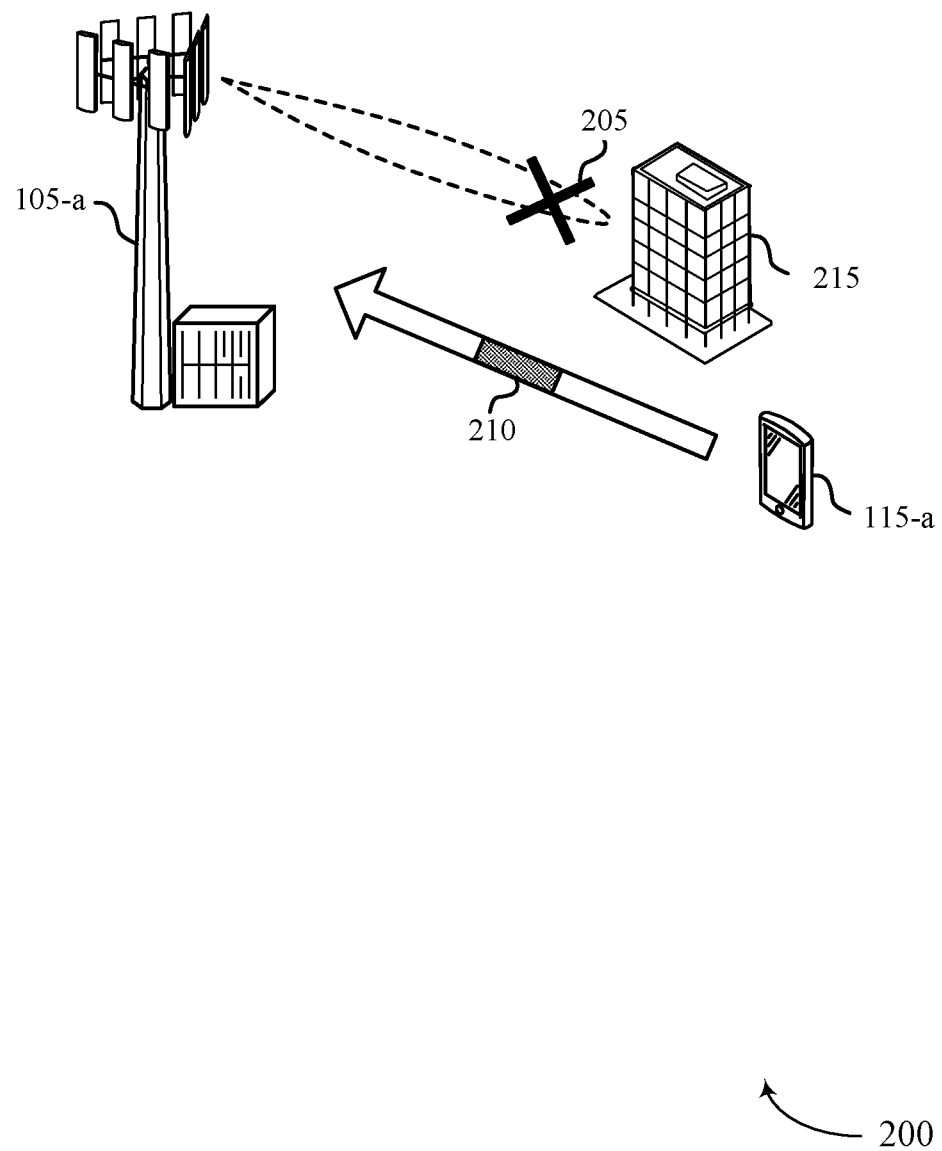
FIG. 2 illustrates an example of a wireless communications system that supports lower layer BFIs for wireless communications in accordance with aspects of the present disclosure.
Figure 3:
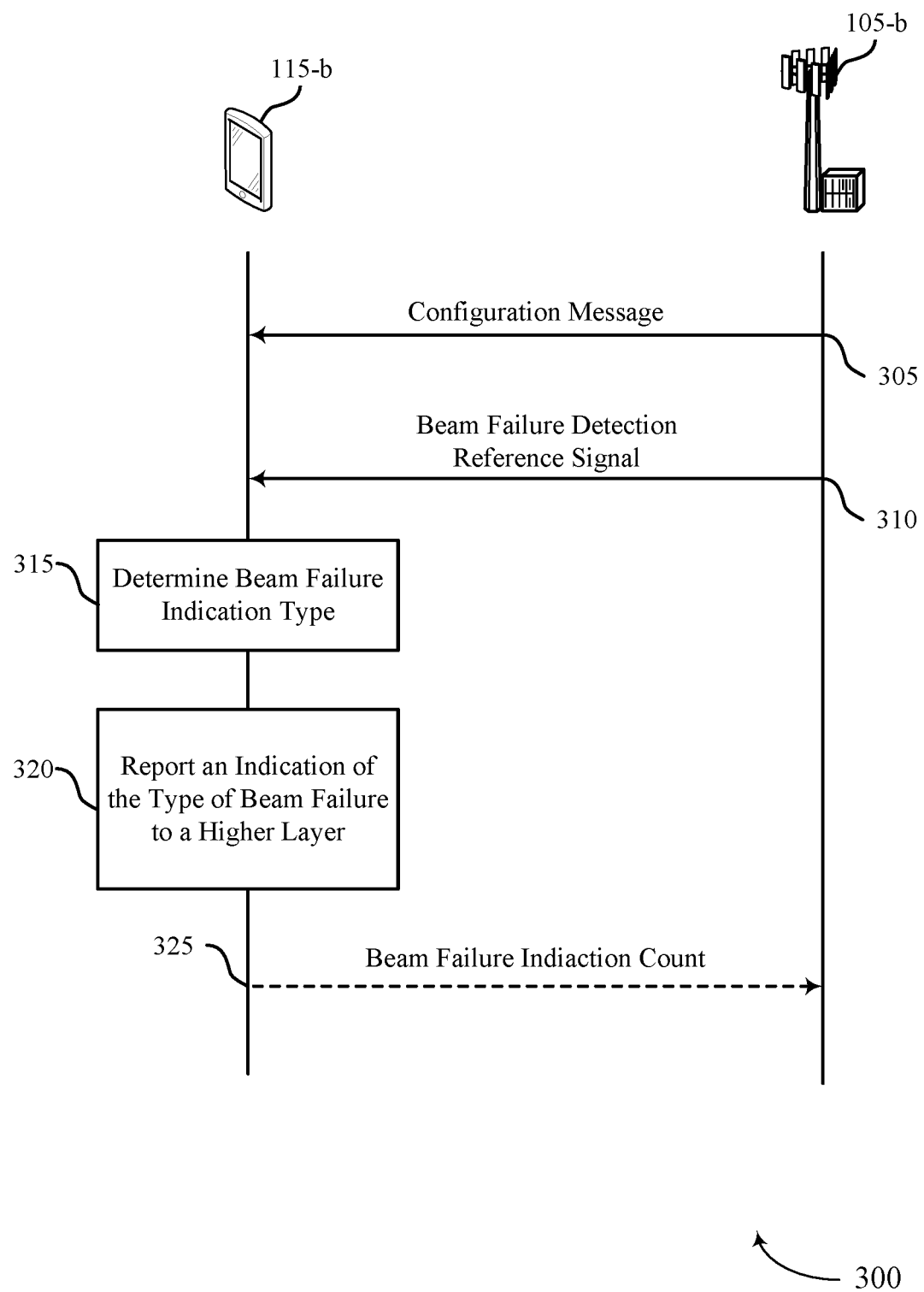
FIG. 3 illustrates an example of a process flow that supports lower layer BFIs for wireless communications in accordance with aspects of the present disclosure.

FIG. 2 illustrates an example of a wireless communications system 200 that supports lower layer BFIs for wireless communications in accordance with aspects of the present disclosure. In some cases, the wireless communications system 200 may implement aspects of the wireless communications system 100. For example, the wireless communications system 200 may include a UE 115-*a* and a base station 105-*a*, which may be examples of corresponding devices as described herein, including those described with reference to FIG. 1.

As described herein, the base station 105-*a* may configure the UE 115-*a* with one or more channel quality thresholds (e.g., via RRC signaling) which may correspond to different channel quality and interference measurements associated with a communications beam signaled between the base station 105-*a* and the UE 115-*a*. In cases that the UE 115-*a* identifies a BFI, the UE 115-*a* may compare beam measurements to one or more of the channel measurement thresholds to more accurately determine if the identified BFI is associated with a poor channel quality or if the BFI is associated with an temporary interference. The UE 115-*a* may use this determination to identify whether the BFI is a first BFI type or a second BFI type to report to a higher layer.

Wireless communications at high frequencies (e.g., mmW frequencies, FR2 and FR2x)) such as those supported by wireless communications system 200, may be associated with increased signal attenuation (e.g., pathloss) or poor channel quality due to various factors such as temperature, barometric pressure, diffraction, weather conditions, etc. In addition, transmissions between wireless devices operating in a high frequency range may experience temporary interference from physical obstructions such as physical barriers, other wireless devices, or other blockages 215. In such cases, the base station 105-*a* and the UE 115-*a* may implement various beamforming techniques to attempt to overcome pathloss to mitigate interference or poor channel quality. In some cases, however, mitigation techniques may be insufficient to overcome the poor channel quality or temporary interference, and the UE 115-*a* may identify a beam failure event 205, in which the UE 115-*a* reports a threshold number of BFI.

The UE 115-*a* and base station 105-*a* may identify a beam failure using, for example, a beam failure detection procedure. The base station 105-*a* may transmit a reference signal, such as a beam failure detection reference signal (BFD-RS) or other reference signal, to the UE 115-*a*, and the UE 115-*a* may perform channel quality measurements using the BFD-RS to evaluate the signal quality associated with the beam. For example, the UE 115-*a* may measure the SINR associated with the BFD-RS and use the SINR value to estimate the block error ratio (BLER) associated with the BFD-RS. Additionally or alternatively, the base station 105-*a* may configure the UE 115-*a* with a threshold value that corresponds to the estimated BLER via RRC signaling. The UE 115-*a* may compare the estimated BLER value to the configured threshold BLER value (e.g., threshold_BLER) such that if the BLER is greater than the threshold (e.g., if measured BLER>threshold_BLER), the UE 115-*a* may record a BFI. For example, in cases where the estimated BLER is greater than the threshold, the UE 115-*a* may signal a first BFI type to a higher layer (e.g., a MAC layer). In some examples, the UE 115-*a* may report the first BFI type, and in cases that the UE 115-*a* reports a threshold number of BFIs in a time period (e.g., to a higher layer), the higher layer may declare beam failure.

The determination of the first BFI type, however, may rely exclusively on SINR measurements of the BFD-RS such that the UE 115-*a* may be unable to distinguish between a BFI caused by insufficient channel quality or noise, and a BFI caused by temporary interference. For example, a BFI caused by temporary interference may resolve itself in less time than it would take to perform a beam failure reestablishment procedure (e.g., the temporary interference may move away or the UE 115-a may move such that the beam failure is resolved). However, by relying solely on SINR, the UE 115-a may still report the first BFI type, thus prompting a full beam failure recovery procedure. Thus, by evaluating BFI using additional metrics and reporting a second BFI type 210 may reduce the number of beam failure recovery procedures performed by the UE 115-a which in turn may decrease the overall power consumption of the UE 115-a, communications latency, and system overhead.

To increase the efficiency of BFI reporting and evaluation of beam failure interference, the UE 115-a may use a second BFI type 210 that indicates high interference (e.g., in addition to, or instead of the first BFI type). BFI types (e.g., the first BFI type or the second BFI type 210) may be determined by channel strength and interference power measurements. The base station 105-a may configure the UE 115-a (e.g., via RRC signaling) with multiple thresholds which may correspond to a variety of signal quality and interference measurements for a BFD-RS, and which may be applied when the SINR for the beam is less than a threshold SINR (e.g., SINR<threshold_sinr).

In some implementations, the UE 115-a may determine a BFI type based on SINR and SNR measurements. The base station 105-a may configure the UE 115-a with a threshold for the absolute value of a measured SINR associated with a BFD-RS (e.g., threshold_sinr) and a threshold for the absolute value of a measured SNR associated with the BFD-RS (e.g., threshold_snr). In such cases, the UE 115-a may determine the BFI type by operating in accordance with Table 1:

Table 1

| SINR/SNR | High (\|SNR\| ≥ threshold_snr) | Low (\|SNR\|< threshold_snr) |
| --- | --- | --- |
| High (\|SINR\| ≥ threshold sinr) | N/A | N/A |
| Low (\|SINR\| < threshold sinr) | Second BFI Type | First BFI Type |

For example, in cases in which the absolute value of the SINR for a BFD-RS is greater than or equal to the configured SINR threshold (e.g., high SINR), the UE 115-a may determine that the beam quality is sufficient enough such that the UE 115-a may refrain from recording a BFI. In some other examples, if the absolute value of the SINR for the BFD-RS is below the configured threshold SINR value (e.g., low SINR), the UE 115-a may determine which BFI type to record by evaluating the absolute value of the SNR associated with the BFD-RS. For example, if the absolute value of the SNR for the BFD-RS is greater than or equal to the configured SNR threshold (e.g., low SINR, high SNR), the UE 115-a may determine that the BFI was caused by temporary interference, and as such the UE 115-a may report the second BFI type 210 (e.g., to a higher layer). If, however the absolute value of the SNR for the BFD-RS is less than the configured SNR threshold (e.g., low SINR, low SNR), the UE 115-a may determine that the BFI may have been caused by inadequate channel quality or high noise, and as such the UE 115-a may report the first BFI type.

In some other implementations the base station 105-a determine a BFI type based on a threshold for the absolute value of the SINR associated with a BFD-RS (e.g., threshold_sinr) and a threshold for the relative value between the SINR and SNR associated with the BFD-RS (e.g., threshold_diff). In such cases, the UE 115-a may determine the BFI type by operating in accordance with Table 2:

Table 2

| SINR/SNR | High (SNR-SINR≥ threshold_diff) | Low (SNR-SINR< threshold_diff) |
| --- | --- | --- |
| High (\|SINR\| ≥ threshold sinr) | N/A | N/A |
| Low (\|SINR\| < threshold sinr) | Second BFI Type | First BFI Type |

For example, in cases in which the absolute value of the SINR for a BFD-RS is greater than or equal to the configured SINR threshold (e.g., high SINR), the UE 115-a may determine that the beam quality is sufficient enough such that the UE 115-a may refrain from recording a BFI. In some other examples, if the absolute value of the SINR for the BFD-RS is below the configured threshold SINR value (e.g., low SINR), the UE 115-a may determine a BFI type to record by evaluating the difference between the SNR value and the SINR value associated with the BFD-RS. For example, if the value of the difference between the SNR value and SINR value for the BFD-RS is greater than or equal to the configured threshold (e.g., low SINR, high SNR-SINR), the UE 115-a may determine that the BFI is associated with temporary interference, and as such the UE 115-a may report the second BFI type 210 to a higher layer. If, however, the value of the difference between the SNR value and SINR value for the BFD-RS is less than the configured threshold (e.g., low SINR, low SNR-SINR), the UE 115-a may determine that the BFI may be associated with low channel quality, and the UE 115-a may report first BFI type to the higher layer.

In some other implementations the UE 115-a may determine the BFI type based on various signal filtering outputs of the SINR measurement corresponding to the BFD-RS. For example, the UE 115-a may configure a first reference signal filter that receives the BFD-RS from the base station 105-a and outputs (e.g., output 1) the average SINR value of the BFD-RS over a period of time configured by the base station 105-a. The UE 115-a may also configure a second reference signal filter that receives the BFD-RS from the base station 105-a and outputs (e.g., output 2) an instantaneous SINR value of the BFD-RS.

The base station 105-a may configure the UE 115-a with a threshold that corresponds to the absolute value of the relative difference between the first output and the second output (e.g., threshold_filterDiff). For example, if the if difference between the average SINR value and the instantaneous SINR value are less than a threshold (e.g., |output 1−output 2|<threshold_filterDiff) the UE 115-a may determine that the average and instantaneous SINR values are similar, and that the BFI may be associated with poor channel quality. Accordingly, the UE 115-a may report the first BFI type to a higher layer. Otherwise, if the difference between the average SINR value and instantaneous SINR value are greater than or equal to a threshold (e.g., |output 1−output 2|≥threshold_filterDiff), the UE 115-a may determine that the instantaneous SINR and the average SINR are dissimilar, and that the BFI may be associated with temporary interference. Accordingly, the UE 115-a may report the second BFI type 210 to a higher layer.

In some other implementations the base station 105-a may configure the UE 115-a with a threshold for the absolute value of the SINR associated with the BFD-RS (e.g., threshold_sinr) and a threshold for the pathloss associated with the BFD-RS (e.g., threshold_pathloss). In such cases, the UE 115-a may determine the BFI type by operating in accordance with Table 3:

Table 3

| SINR/Pathloss | High (Pathloss≥ threshold_pathloss) | Low (Pathloss< threshold_pathloss) |
|---|---|---|
| High ($\|SINR\|$ ≥ threshold sinr) | N/A | N/A |
| Low ($\|SINR\|$ < threshold sinr) | First BFI Type | Second BFI Type |

For example, in cases in which the absolute value of the SINR for a BFD-RS is greater than or equal to the configured SINR threshold (e.g., high SINR), the UE 115-a may determine that the beam quality is high enough such that the UE 115-a may refrain from recording a BFI. In some other examples, if the absolute value of the SINR for the BFD-RS is below the configured threshold SINR value (e.g., low SINR), the UE 115-a may determine which BFI type to record by evaluating the pathloss associated with the BFD-RS. For example, the UE 115-a may perform a reference signal received power (RSRP) operation to determine a long-term average measurement of the pathloss associated with the BFD-RS, or the UE 115-a may perform measurements associated with a channel quality indicator (CQI) report to determine a short term measurement of the pathloss associated with the BFD-RS. In cases in which the pathloss value is greater than or equal to the configured pathloss threshold (e.g., low SINR, high pathloss), the UE 115-a may determine that the BFI is associated with poor channel quality, and in such cases, the UE 115-a may signal the first BFI type to a higher layer. In cases in which the pathloss value is less than the configured pathloss threshold (e.g., low SINR, low pathloss), the UE 115-a may determine that the BFI is associated with temporary interference, and as such the UE 115-a may signal the second BFI type 210 to a higher layer.

In any of the aforementioned examples, the base station 105-a may configure the thresholds (e.g., threshold_sinr, threshold_snr, threshold_diff, threshold_filterDiff, threshold_pathloss, and various filter coefficients) for use by the UE 115-a to determine BFI type. In some cases, the base station 105-a may configure the thresholds using an RRC configuration (e.g., L3 signaling) indicating a set of values of the thresholds. In some other cases, the base station 105-a may use downlink control information (DCI) and medium access medium access control (MAC) control element (MAC-CE) (e.g., L1/L2 signaling) to indicate a switch of threshold values.

Additionally or alternatively, the base station 105-a may transmit different types of BFD-RS to the UE 115-a associated with different BFI types. For example, in some cases, the base station 105-a may transmit a first BFD-RS type to the UE 115-a which may configure the UE 115-a to report the first BFI type or the second BFI type 210. In some cases, the base station 105-a may transmit the first BFD-RS type and the second BFD-RS type so that the UE 115-a may determine whether the BFI is associated with the first BFI type or the second BFI type 210 based on the first BFD-RS and the second BFD-RS. In some cases, the base station 105-a may transmit the first BFD-RS type with special instructions for the UE 115-a to measure additional parameters to characterize channel and interference strength associated with the BFD-RS which may be used to determine whether the BFI type is associated with the first BFI type or the second BFI type 210. In such cases, the special instructions may be applied to all BFD-RS occasions, or on BFD-RS occasions selected by the base station 105-a.

By introducing the second BFI type 210 and the various thresholds used for determining the second BFI type 210, the UE 115-a may more effectively evaluate different kinds of BFI reporting caused by channel quality and BFI reporting caused by interference. This may decrease the frequency of full beam recovery procedures the UE 115-a performs, thus decreasing the power consumption, decreasing signal overhead, and reducing latency within the network.

FIG. 1 illustrates an example of a process flow 100 that supports lower layer BFIs for wireless communications in accordance with aspects of the present disclosure. In some examples, process flow 300 may implement aspects of wireless communications system 100, wireless communications system 200, or a combination thereof. Process flow 300 includes a UE 115-b and a base station 105-b, which may be respective examples of a UE 115 and a base station 105 as described with reference to FIGS. 1 and 2. Alternative examples of the following may be implemented, where some steps are performed in a different order than described or are not performed at all. In some cases, steps may include additional features not mentioned below, or further steps may be added. In addition, while process flow 300 shows processes between a single base station 105-b and UE 115-b, it should be understood that these processes may occur between any number of network devices.

At 305, the UE 115-b may receive a configuration message from the base station 105-b, which may indicate a channel quality threshold for determining a type of BFI to be an interference-based BFI. In some cases, the UE 115-b may receive the configuration message via an RRC message. In some cases, if multiple configurations are configured via RRC, the base station 105-b may use downlink control information or a MAC-CE to indicate a change of configurations.

At 310, the UE 115-b may receive a reference signal from the base station 105-b for performing one or more signal measurements in accordance with the configuration. In some cases, the reference signal the UE 115-b receives from the base station 105-b may be a BFD-RS (e.g., CSI-RS or SSB). In some examples, the BFD-RS that the UE 115-b receives from the base station 105-b may be specific to a type of BFI (e.g., an interreference-based BFI or a channel-based BFI). In some examples, the BFD-RS may instruct the UE 115-b to measure one or more parameters to determine whether the BFI is the interference-based BFI or the channel-based BFI.

At 315, the UE 115-b may determine the BFI type through one of the various implementations disclosed herein.

In some implementations, the UE 115-b may receive an indication of a second channel quality threshold from the base station 105-b. For example, the first channel quality threshold may include an SINR threshold (e.g., corresponding to the SINR measurement of the reference signal) and the second channel quality threshold may include an SNR threshold (e.g., corresponding to the SNR measurement of the reference signal). The UE 115-b may use these thresholds to determine the type of BFI. For example, if the SINR measurement of the reference signal is less than the SINR threshold and the SNR measurement of the reference signal is greater than or equal to the SNR threshold, the UE 115-b may determine that the BFI is the interference-based BFI type. In another example, if the SINR measurement of the reference signal is less than the SINR threshold and the SNR measurement of the reference signal is less than the SNR threshold, the UE 115-b may determine that the BFI is the channel-based BFI type.

In some other implementations, the UE 115-b may receive a different indication of a second channel quality threshold from the base station 105-b. For example, the first channel quality threshold may include an SINR threshold and the second channel quality threshold may include a difference threshold (e.g., corresponding to the difference between the SNR measurement for the reference signal and the SINR measurement for the reference signal). The UE 115-*b* may use these thresholds to determine the type of BFI.

For example, if the SINR measurement for the reference signal is less than the SINR threshold and the difference between the SNR measurement of the reference signal and the SINR measurement of the reference signal is greater than or equal to the signal difference threshold, the UE 115-*b* may determine that the BFI is the interference-based BFI type. In another example, if the SINR measurement for the reference signal is less than the SINR threshold and the difference between the SNR measurement of the reference signal and the SINR measurement of the reference signal is less than the signal difference threshold, the UE 115-*b* may determine that the BFI is the channel-based BFI type.

In some other implementations, the UE 115-*b* may receive a different indication of a second channel quality threshold from the base station 105-*b*. For example, the first channel quality threshold may include an SINR threshold and the second channel quality threshold may include a filter difference threshold (e.g., corresponding to the absolute value of the difference between the average SINR measurement of the reference signal and the SINR measurement of the reference signal). For example, if the SINR measurement for the reference signal is less than the SINR threshold and the absolute value of the difference between the average SINR measurement of the reference signal and the SINR measurement of the reference signal is greater than or equal to the filter difference threshold, the UE 115-*b* may determine that the BFI is the interference-based BFI type.

In another example, if the SINR measurement for the reference signal is less than the SINR threshold and the absolute value of the difference between the average SINR measurement of the reference signal and the SINR measurement of the reference signal is less than the filter difference threshold, the UE 115-*b* may determine that the BFI is the channel-based BFI type.

In some other implementations, the UE 115-*b* may receive a different indication of a second channel quality threshold from the base station 105-*b*. For example, the first channel quality threshold may include an SINR threshold and the second channel quality threshold may include a pathloss threshold (e.g., corresponding to the pathloss of the reference signal). For example, if the SINR measurement for the reference signal is less than the SINR threshold and the pathloss of the reference signal is less than the pathloss threshold, the UE 115-*b* may determine that the BFI is the interference-based BFI type. In another example, if the SINR measurement for the reference signal is less than the SINR threshold and the pathloss of the reference signal is greater than or equal to the pathloss threshold, the UE 115-*b* may determine that the BFI is the channel-based BFI type. In some examples, the pathloss of the reference signal is indicated by a RSRP measurement or a CQI report.

At 320, the UE 115-*b* may report an indication of the type of BFI based on the one or more signal measurements and channel quality thresholds. In some cases, the UE 115-*b* may report the indication to a higher layer (e.g., a MAC layer). At 325, the UE 115-*b* may optionally transmit a report to the base station 105-*b* that may include a count of BFIs at the UE 115-*b*. The count of BFIs may correspond to a beam associated with the BFI or all beams configured for the UE 115-*b*. In some examples, the UE 115-*b* may transmit the report via uplink control information or a MAC-CE.

Figure 4:
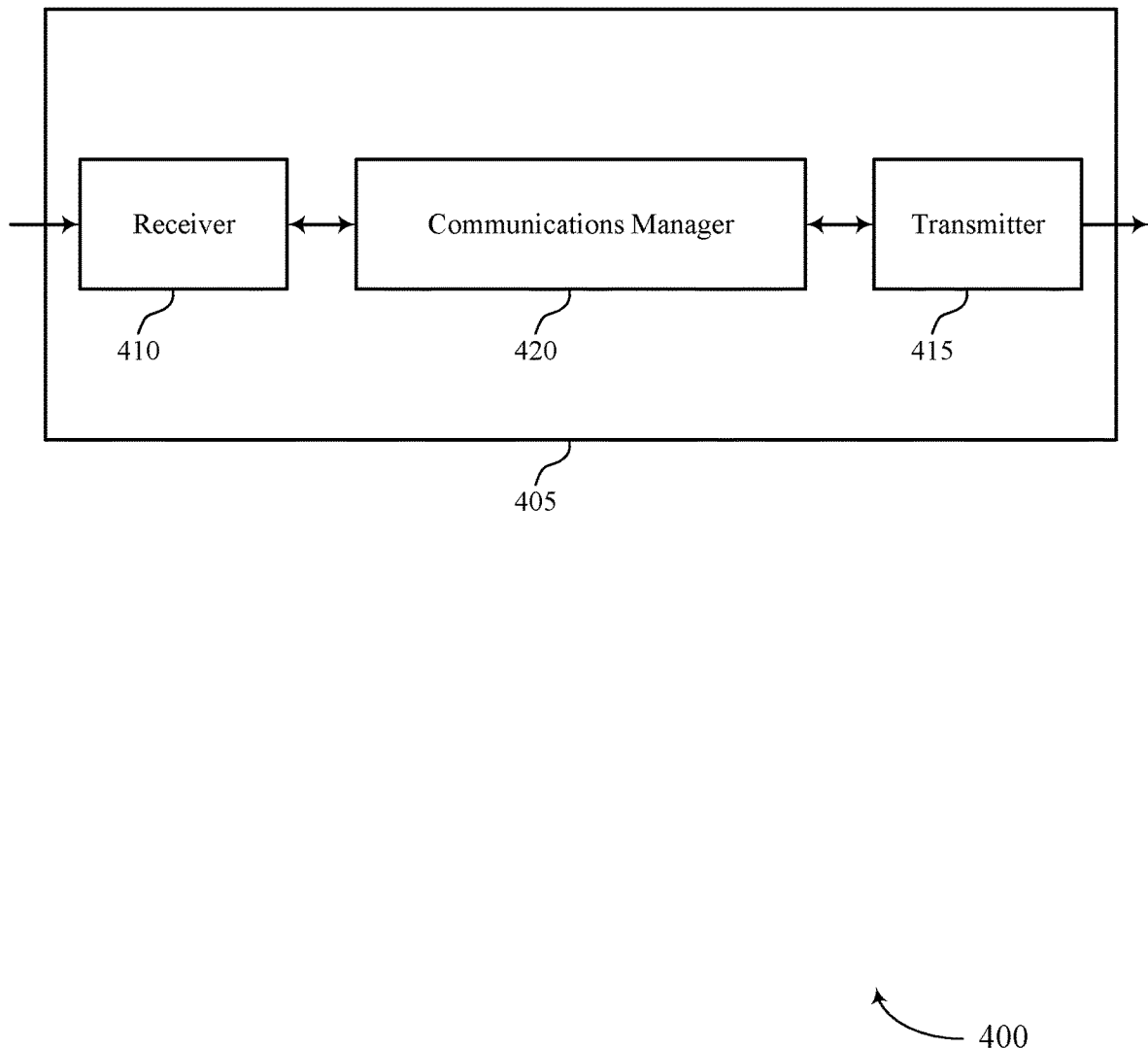
FIGS. 4 and 5 show block diagrams of devices that support lower layer BFIs for wireless communications in accordance with aspects of the present disclosure.

FIG. 4 shows a block diagram 400 of a device 405 that supports lower layer BFIs for wireless communications in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to lower layer BFIs for wireless communications). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to lower layer BFIs for wireless communications). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of lower layer BFIs for wireless communications as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a UE in accordance with examples as disclosed herein. For example, the communications manager 420 may be configured as or otherwise support a means for receiving, from a base station, a configuration indicating a channel quality threshold for determining a type of BFI to be an interference-based BFI. The communications manager 420 may be configured as or otherwise support a means for receiving, from the base station, a reference signal for performing one or more signal measurements in accordance with the configuration. The communications manager 420 may be configured as or otherwise support a means for reporting an indication of the type of BFI, where the type of BFI is based on the one or more signal measurements and the channel quality threshold.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing related to beam failure mitigation and reporting, reduced power consumption, and more efficient utilization of communication resources.

Figure 5:
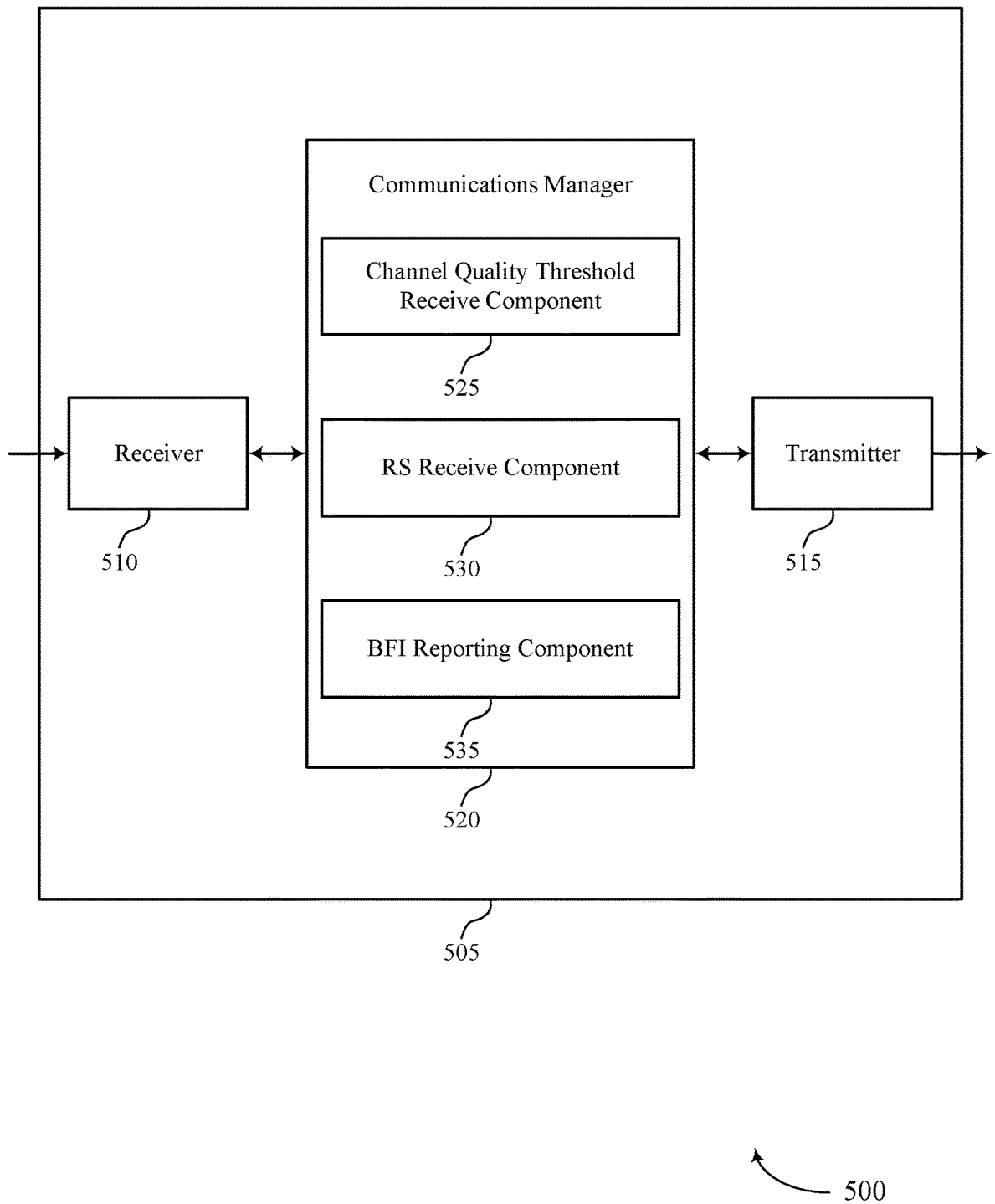

FIG. 5 shows a block diagram 500 of a device 505 that supports lower layer BFIs for wireless communications in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to lower layer BFIs for wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to lower layer BFIs for wireless communications). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of lower layer BFIs for wireless communications as described herein. For example, the communications manager 520 may include a channel quality threshold receive component 525, a reference signal (RS) receive component 530, a BFI reporting component 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. The channel quality threshold receive component 525 may be configured as or otherwise support a means for receiving, from a base station, a configuration indicating a channel quality threshold for determining a type of BFI to be an interference-based BFI. The RS receive component 530 may be configured as or otherwise support a means for receiving, from the base station, a reference signal for performing one or more signal measurements in accordance with the configuration. The BFI reporting component 535 may be configured as or otherwise support a means for reporting an indication of the type of BFI, where the type of BFI is based on the one or more signal measurements and the channel quality threshold.

Figure 6:
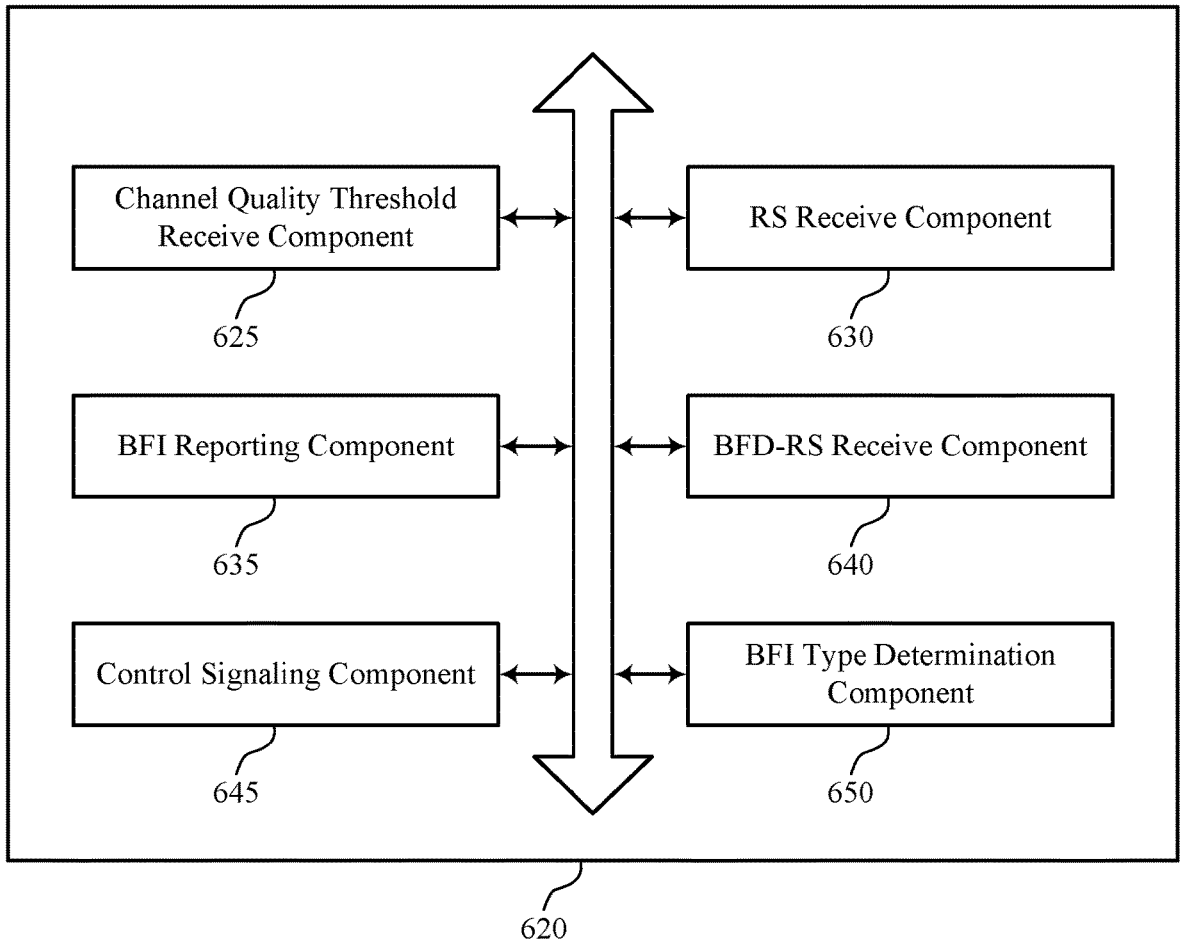
FIG. 6 shows a block diagram of a communications manager that supports lower layer BFIs for wireless communications in accordance with aspects of the present disclosure.

FIG. 6 shows a block diagram 600 of a communications manager 620 that supports lower layer BFIs for wireless communications in accordance with aspects of the present disclosure. The communications manager 620 may be an example of aspects of a communications manager 420, a communications manager 520, or both, as described herein. The communications manager 620, or various components thereof, may be an example of means for performing various aspects of lower layer BFIs for wireless communications as described herein. For example, the communications manager 620 may include a channel quality threshold receive component 625, an RS receive component 630, a BFI reporting component 635, an BFD-RS receive component 640, a control signaling component 645, a BFI type determination component 650, or any combination thereof. Each of these components may communicate, directly or indirectly, with one another (e.g., via one or more buses).

The communications manager 620 may support wireless communications at a UE in accordance with examples as disclosed herein. The channel quality threshold receive component 625 may be configured as or otherwise support a means for receiving, from a base station, a configuration indicating a channel quality threshold for determining a type of BFI to be an interference-based BFI. The RS receive component 630 may be configured as or otherwise support a means for receiving, from the base station, a reference signal for performing one or more signal measurements in accordance with the configuration. The BFI reporting component 635 may be configured as or otherwise support a means for reporting an indication of the type of BFI, where the type of BFI is based on the one or more signal measurements and the channel quality threshold.

In some examples, the channel quality threshold receive component 625 may be configured as or otherwise support a means for receiving an indication of a second channel quality threshold, the channel quality threshold including a SINR threshold and the second channel quality threshold including a SNR threshold, where the type of BFI is determined based on the first and second channel quality thresholds.

In some examples, the one or more signal measurements includes a SINR measurement of the reference signal and a SNR measurement of the reference signal, and the BFI type determination component 650 may be configured as or otherwise support a means for determining that the BFI is the interference-based BFI based on the SINR measurement of the reference signal being less than the SINR threshold and the SNR measurement of the reference signal being greater than the SNR threshold. In some examples, the one or more signal measurements includes a SINR measurement of the reference signal and a SNR measurement of the reference signal, and the BFI type determination component 650 may be configured as or otherwise support a means for determining that the BFI is a channel-based BFI based on the SINR measurement of the reference signal being less than the SINR threshold and the SNR measurement of the reference signal being less than the SNR threshold.

In some examples, the channel quality threshold receive component 625 may be configured as or otherwise support a means for receiving an indication of a second channel quality threshold, the channel quality threshold including a SINR threshold and the second channel quality threshold including a signal difference threshold, where the type of BFI is determined based on the first and second channel quality thresholds.

In some examples, the one or more signal measurements includes a SINR measurement of the reference signal and a SNR measurement of the reference signal, and the BFI type determination component 650 may be configured as or otherwise support a means for determining that the BFI is the interference-based BFI based on the SINR measurement of the reference signal being less than the SINR threshold and a difference between the SINR measurement of the reference signal and the SNR measurement of the reference signal being greater than the signal difference threshold. In some examples, the one or more signal measurements includes a SINR measurement of the reference signal and a SNR measurement of the reference signal, and the BFI type determination component 650 may be configured as or otherwise support a means for determining that the BFI is a channel-based BFI based on the SINR measurement of the reference signal being less than the SINR threshold and the difference between the SINR measurement of the reference signal and the SNR measurement of the reference signal being less than the signal difference threshold.

In some examples, the channel quality threshold receive component 625 may be configured as or otherwise support a means for receiving an indication of a second channel quality threshold, the channel quality threshold including a SINR threshold and the second channel quality threshold including a filter difference threshold, where the type of BFI is determined based on the first and second channel quality thresholds.

In some examples, the one or more signal measurements includes a SINR measurement of the reference signal and an average SINR measurement of the reference signal, and the BFI type determination component 650 may be configured as or otherwise support a means for determining that the BFI is the interference-based BFI based on the SINR measurement of the reference signal being less than the SINR threshold and a difference between the SINR measurement of the reference signal and the average SINR measurement of the reference signal being greater than the filter difference threshold. In some examples, the one or more signal measurements includes a SINR measurement of the reference signal and an average SINR measurement of the reference signal, and the BFI type determination component 650 may be configured as or otherwise support a means for determining that the BFI is a channel-based BFI based on the SINR measurement of the reference signal being less than the SINR threshold and the difference between the SINR measurement of the reference signal and the average SINR measurement of the reference signal being less than the filter difference threshold.

In some examples, the channel quality threshold receive component 625 may be configured as or otherwise support a means for receiving an indication of a second channel quality threshold, the channel quality threshold including a SINR threshold and the second channel quality threshold including a pathloss threshold, where the type of BFI is determined based on the first and second channel quality thresholds.

In some examples, the one or more signal measurements includes a SINR measurement of the reference signal and a pathloss of the reference signal, and the BFI type determination component 650 may be configured as or otherwise support a means for determining that the BFI is the interference-based BFI based on the SINR measurement of the reference signal being less than the SINR threshold and the pathloss of the reference signal being less than the pathloss threshold. In some examples, the one or more signal measurements includes a SINR measurement of the reference signal and a pathloss of the reference signal, and the BFI type determination component 650 may be configured as or otherwise support a means for determining that the BFI is a channel-based BFI based on the SINR measurement of the reference signal being less than the SINR threshold and the pathloss of the reference signal greater less than the pathloss threshold.

In some examples, the pathloss of the reference signal is indicated by a reference signal received power (RSRP) measurement or a channel quality indicator (CQI) report.

In some examples, to support receiving the reference signal, the BFD-RS receive component 640 may be configured as or otherwise support a means for receiving a BFD-RS from the base station.

In some examples, the BFD-RS is specific to one of the interference-based BFI or the channel-based BFI. In some examples, the BFD-RS instructs the UE to measure one or more parameters for determining one of the interference-based BFI or the channel-based BFI.

In some examples, the BFI reporting component 635 may be configured as or otherwise support a means for transmitting, to the base station, a report including a count of BFIs at the UE, the count of BFIs corresponding to a beam associated with the BFI or all beams configured for the UE.

In some examples, the report is transmitted via uplink control information or a medium access control MAC-CE.

In some examples, to support receiving the configuration, the control signaling component 645 may be configured as or otherwise support a means for receiving the configuration via an RRC message, downlink control information, a MAC-CE, or any combination thereof.

Figure 7:
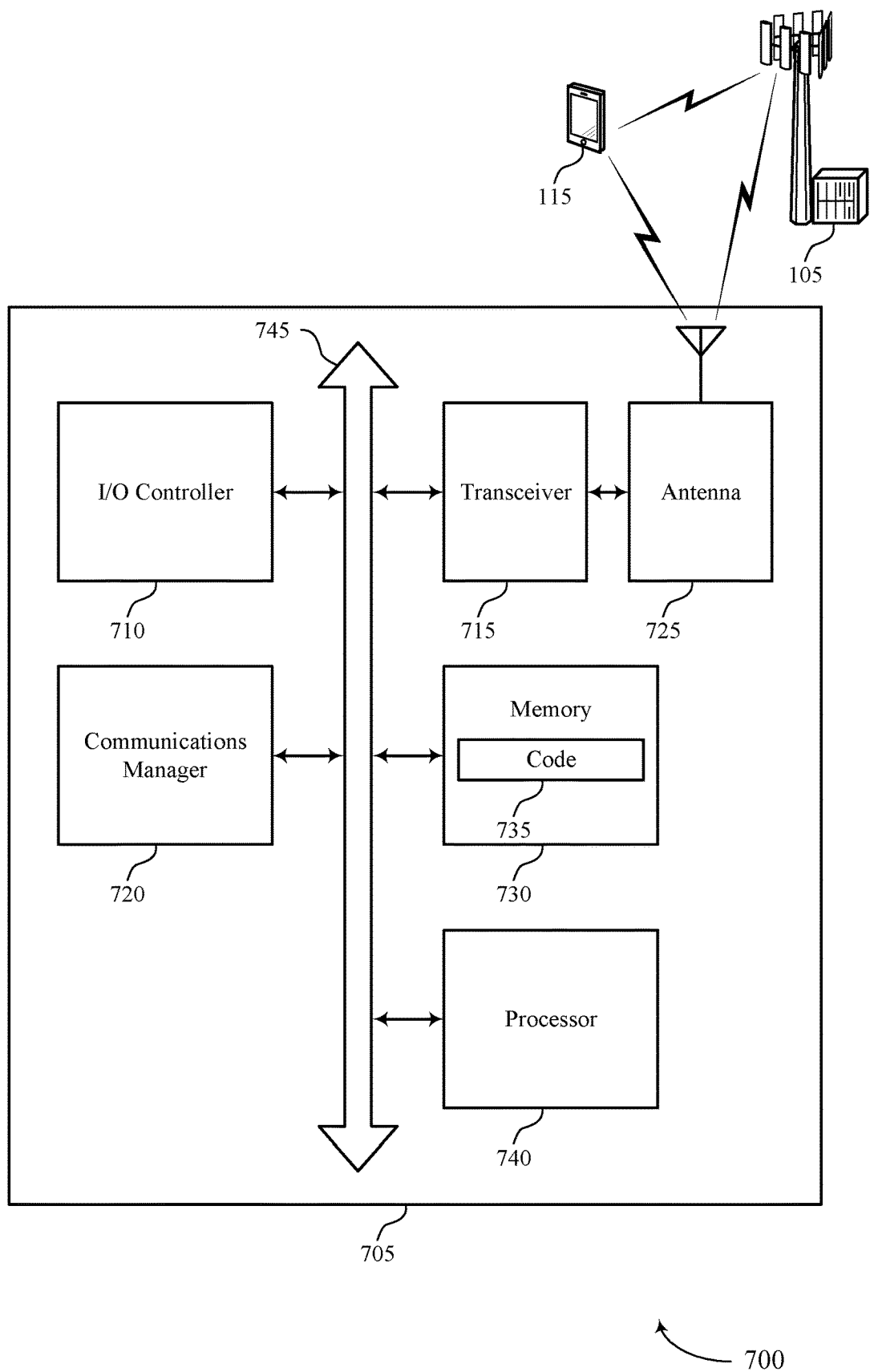
FIG. 7 shows a diagram of a system including a device that supports lower layer BFIs for wireless communications in accordance with aspects of the present disclosure.

FIG. 7 shows a diagram of a system 700 including a device 705 that supports lower layer BFIs for wireless communications in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting lower layer BFIs for wireless communications). For example, the device 705 or a component of the device 705 may include a processor 740 and memory 730 coupled to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a base station, a configuration indicating a channel quality threshold for determining a type of BFI to be an interference-based BFI. The communications manager 720 may be configured as or otherwise support a means for receiving, from the base station, a reference signal for performing one or more signal measurements in accordance with the configuration. The communications manager 720 may be configured as or otherwise support a means for reporting an indication of the type of BFI, where the type of BFI is based on the one or more signal measurements and the channel quality threshold.

By including or configuring the communications manager 720 in accordance with examples as described herein, the device 705 may support techniques for improved communication reliability, reduced latency, improved user experience related to reduced beam failure mitigation processes, reduced power consumption, more efficient utilization of communication resources, and longer battery life.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of lower layer BFIs for wireless communications as described herein, or the processor 740 and the memory 730 may be otherwise configured to perform or support such operations.

Figure 8:
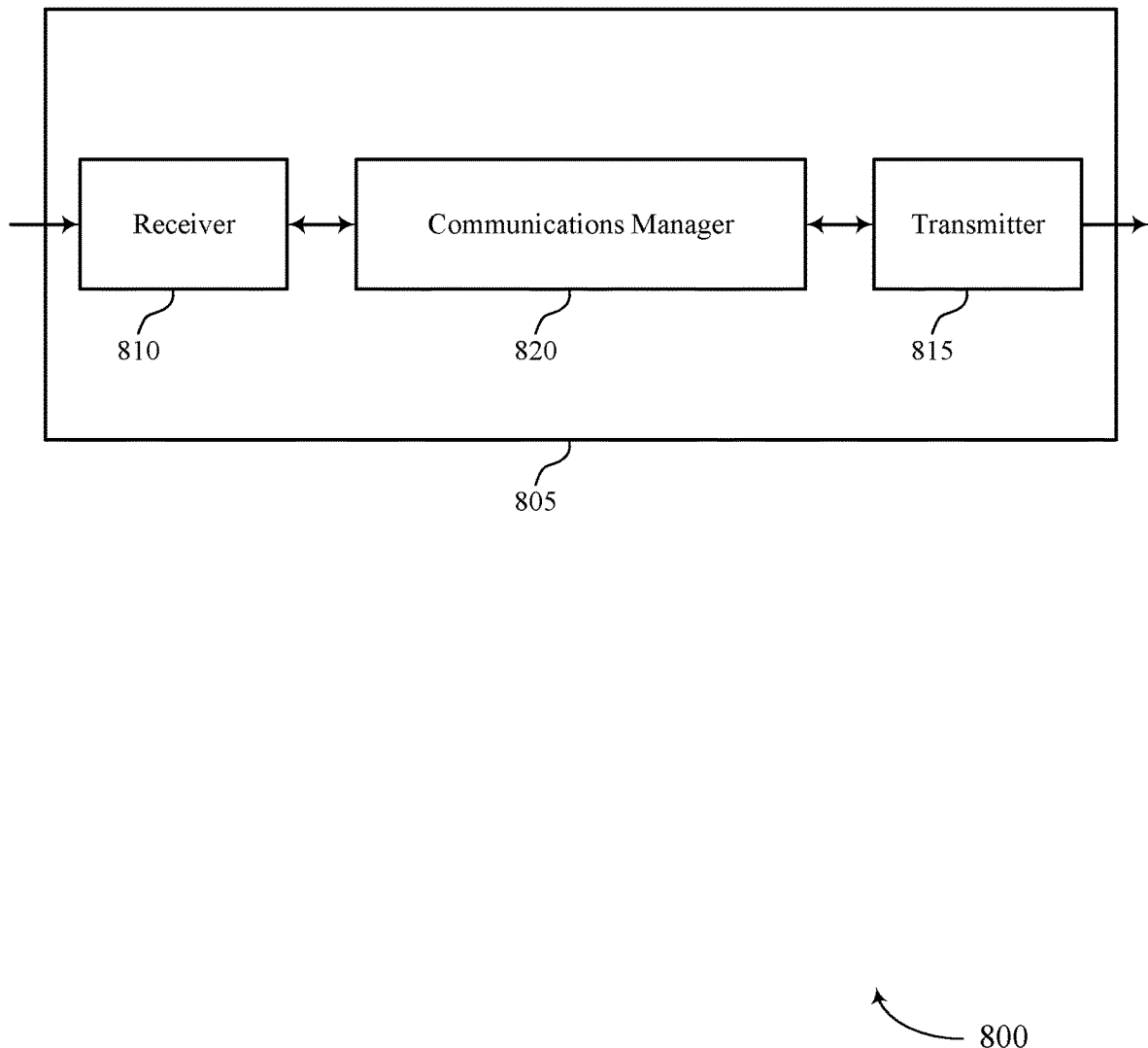
FIGS. 8 and 9 show block diagrams of devices that support lower layer BFIs for wireless communications in accordance with aspects of the present disclosure.

FIG. 8 shows a block diagram 800 of a device 805 that supports lower layer BFIs for wireless communications in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to lower layer BFIs for wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to lower layer BFIs for wireless communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of lower layer BFIs for wireless communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for transmitting, to a UE, a configuration indicating a channel quality threshold for determining a type of BFI to be an interference-based BFI. The communications manager 820 may be configured as or otherwise support a means for transmitting, to the UE, a reference signal for the UE to perform one or more signal measurements in accordance with the configuration. The communications manager 820 may be configured as or otherwise support a means for receiving, from the UE, an indication of a BFI at the UE, the BFI corresponding to one or more beams of the UE.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing related to beam failure mitigation and reporting, reduced power consumption, and more efficient utilization of communication resources.

Figure 9:
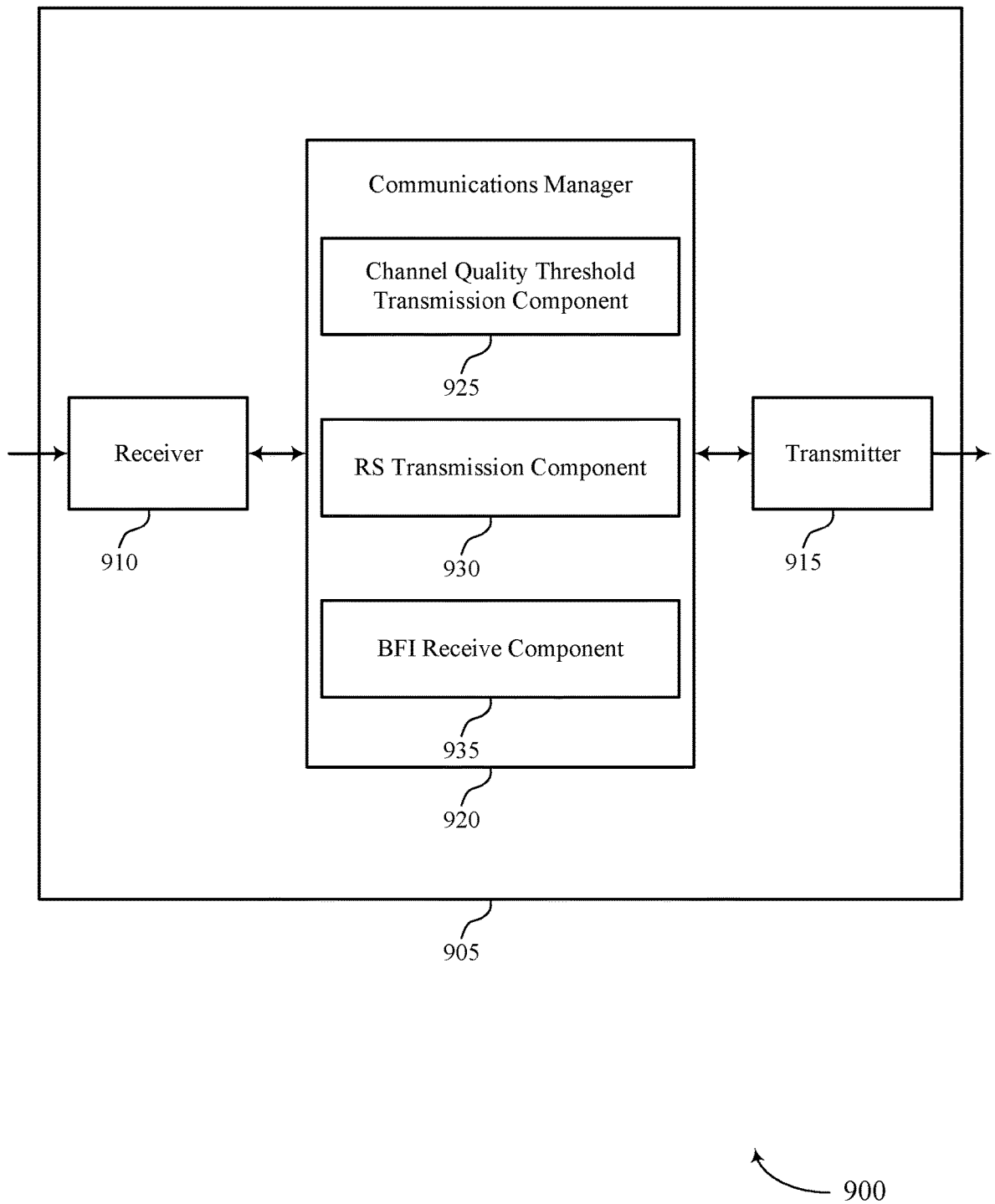

FIG. 9 shows a block diagram 900 of a device 905 that supports lower layer BFIs for wireless communications in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to lower layer BFIs for wireless communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to lower layer BFIs for wireless communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of lower layer BFIs for wireless communications as described herein. For example, the communications manager 920 may include a channel quality threshold transmission component 925, an RS transmission component 930, a BFI receive component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The channel quality threshold transmission component 925 may be configured as or otherwise support a means for transmitting, to a UE, a configuration indicating a channel quality threshold for determining a type of BFI to be an interference-based BFI. The RS transmission component 930 may be configured as or otherwise support a means for transmitting, to the UE, a reference signal for the UE to perform one or more signal measurements in accordance with the configuration. The BFI receive component 935 may be configured as or otherwise support a means for receiving, from the UE, an indication of a BFI at the UE, the BFI corresponding to one or more beams of the UE.

Figure 10:
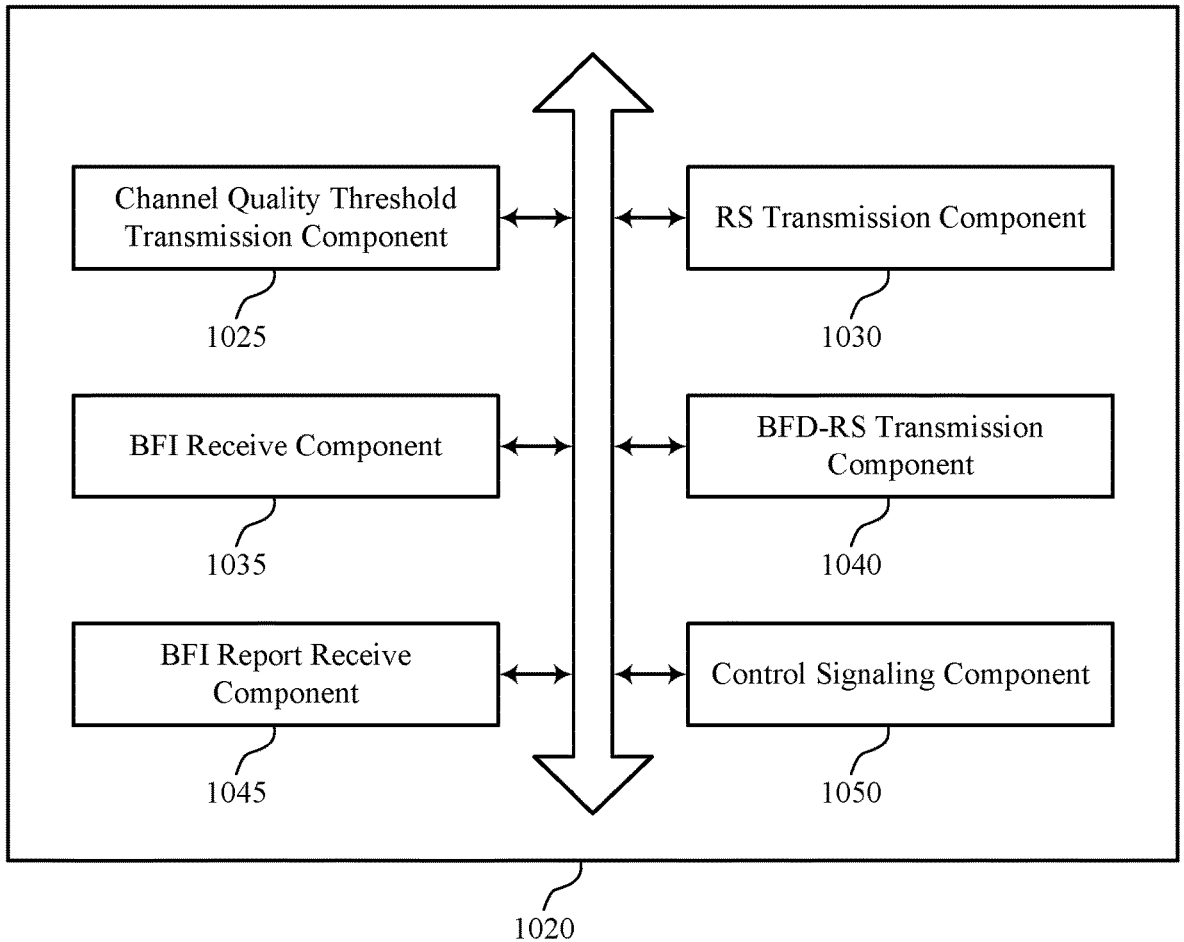
FIG. 10 shows a block diagram of a communications manager that supports lower layer BFIs for wireless communications in accordance with aspects of the present disclosure.

FIG. 10 shows a block diagram 1000 of a communications manager 1020 that supports lower layer BFIs for wireless communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of lower layer BFIs for wireless communications as described herein. For example, the communications manager 1020 may include a channel quality threshold transmission component 1025, an RS transmission component 1030, a BFI receive component 1035, an BFD-RS transmission component 1040, a BFI report receive component 1045, a control signaling component 1050, or any combination thereof. Each of these components may communicate, directly or indirectly, with one another (e.g., via one or more buses).

The communications manager 1020 may support wireless communications at a base station in accordance with examples as disclosed herein. The channel quality threshold transmission component 1025 may be configured as or otherwise support a means for transmitting, to a UE, a configuration indicating a channel quality threshold for determining a type of BFI to be an interference-based BFI. The RS transmission component 1030 may be configured as or otherwise support a means for transmitting, to the UE, a reference signal for the UE to perform one or more signal measurements in accordance with the configuration. The BFI receive component 1035 may be configured as or otherwise support a means for receiving, from the UE, an indication of a BFI at the UE, the BFI corresponding to one or more beams of the UE.

In some examples, the channel quality threshold transmission component 1025 may be configured as or otherwise support a means for transmitting an indication of a second channel quality threshold, the channel quality threshold including a SINR threshold and the second channel quality threshold including a SNR threshold, where the indication of the BFI at the UE is based on the first and second channel quality thresholds.

In some examples, the channel quality threshold transmission component 1025 may be configured as or otherwise support a means for transmitting an indication of a second channel quality threshold, the channel quality threshold including a SINR threshold and the second channel quality threshold including a signal difference threshold, where the indication of the BFI at the UE is based on the first and second channel quality thresholds.

In some examples, the channel quality threshold transmission component 1025 may be configured as or otherwise support a means for transmitting an indication of a second channel quality threshold, the channel quality threshold including a SINR threshold and the second channel quality threshold including a filter difference threshold, where the indication of the BFI at the UE is based on the first and second channel quality thresholds.

In some examples, the channel quality threshold transmission component 1025 may be configured as or otherwise support a means for transmitting an indication of a second channel quality threshold, the channel quality threshold including a SINR threshold and the second channel quality threshold including a pathloss threshold, where the indication of the BFI at the UE is based on the first and second channel quality thresholds.

In some examples, to support transmitting the reference signal, the BFD-RS transmission component 1040 may be configured as or otherwise support a means for transmitting a BFD-RS to the UE.

In some examples, the BFD-RS is specific to one of the interference-based BFI or a channel-based BFI.

In some examples, the BFD-RS instructs the UE to measure one or more parameters for determining the type of BFI to be one of the interference-based BFI or a channel-based BFI.

In some examples, to support receiving the indication of the BFI, the BFI report receive component 1045 may be configured as or otherwise support a means for receiving, from the UE, a report including a count of BFIs at the UE, the count of BFIs corresponding to a beam associated with the BFI or all beams configured for the UE.

In some examples, the report is received via uplink control information or a medium access control MAC-CE.

In some examples, to support transmitting the configuration, the control signaling component 1050 may be configured as or otherwise support a means for transmitting the configuration via an RRC message, downlink control information, a medium access control MAC-CE, or any combination thereof.

Figure 11:
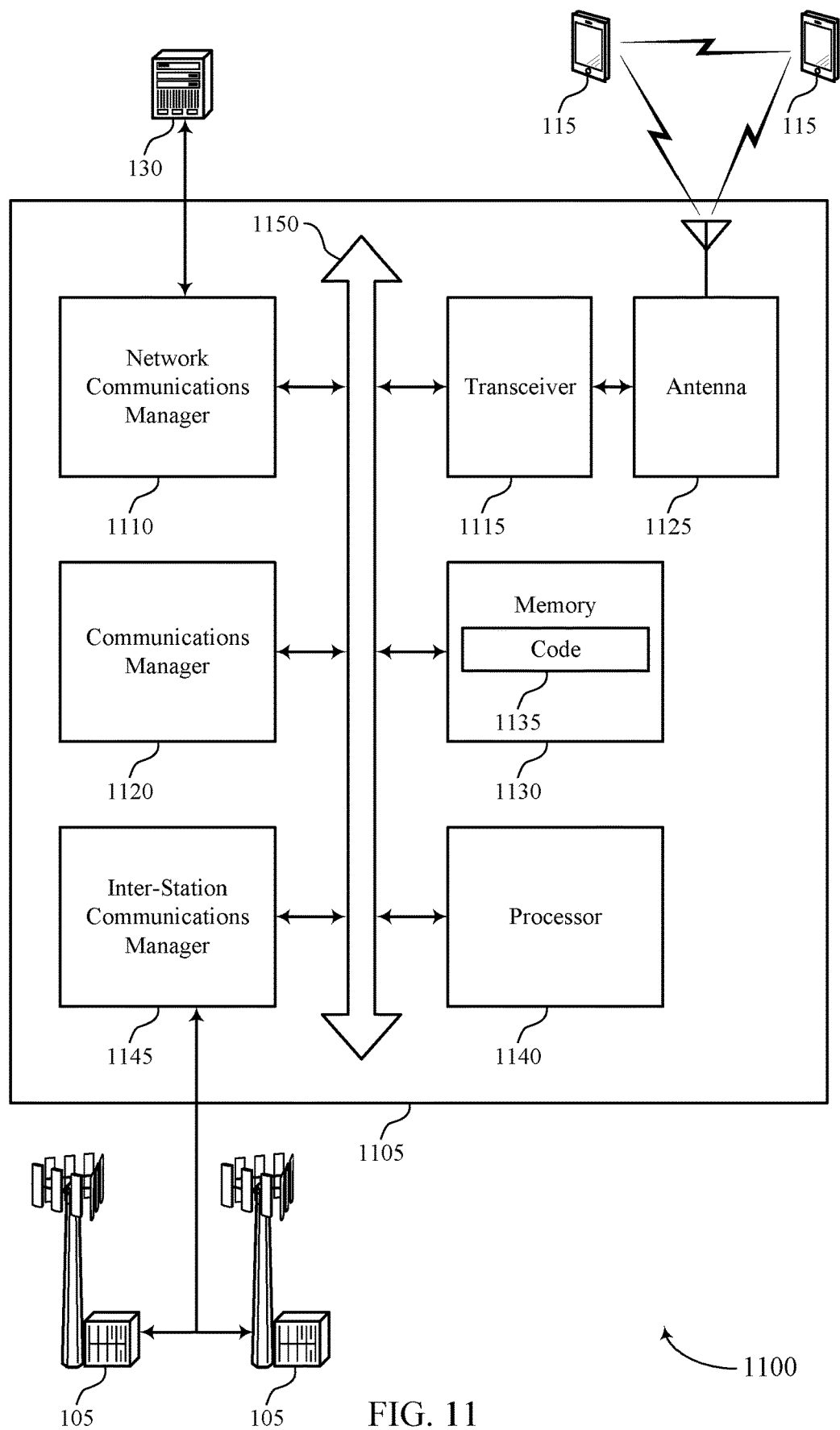
FIG. 11 shows a diagram of a system including a device that supports lower layer BFIs for wireless communications in accordance with aspects of the present disclosure.

FIG. 11 shows a diagram of a system 1100 including a device 1105 that supports lower layer BFIs for wireless communications in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter

815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting lower layer BFIs for wireless communications). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for transmitting, to a UE, a configuration indicating a channel quality threshold for determining a type of BFI to be an interference-based BFI. The communications manager 1120 may be configured as or otherwise support a means for transmitting, to the UE, a reference signal for the UE to perform one or more signal measurements in accordance with the configuration. The communications manager 1120 may be configured as or otherwise support a means for receiving, from the UE, an indication of a BFI at the UE, the BFI corresponding to one or more beams of the UE.

By including or configuring the communications manager 1120 in accordance with examples as described herein, the device 1105 may support techniques for improved communication reliability, reduced latency, improved user experience related to reduced beam failure mitigation processes, reduced power consumption, more efficient utilization of communication resources, improved coordination between devices, and longer battery life.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of lower layer BFIs for wireless communications as described herein, or the processor 1140 and the memory 1130 may be otherwise configured to perform or support such operations.

Figure 12:
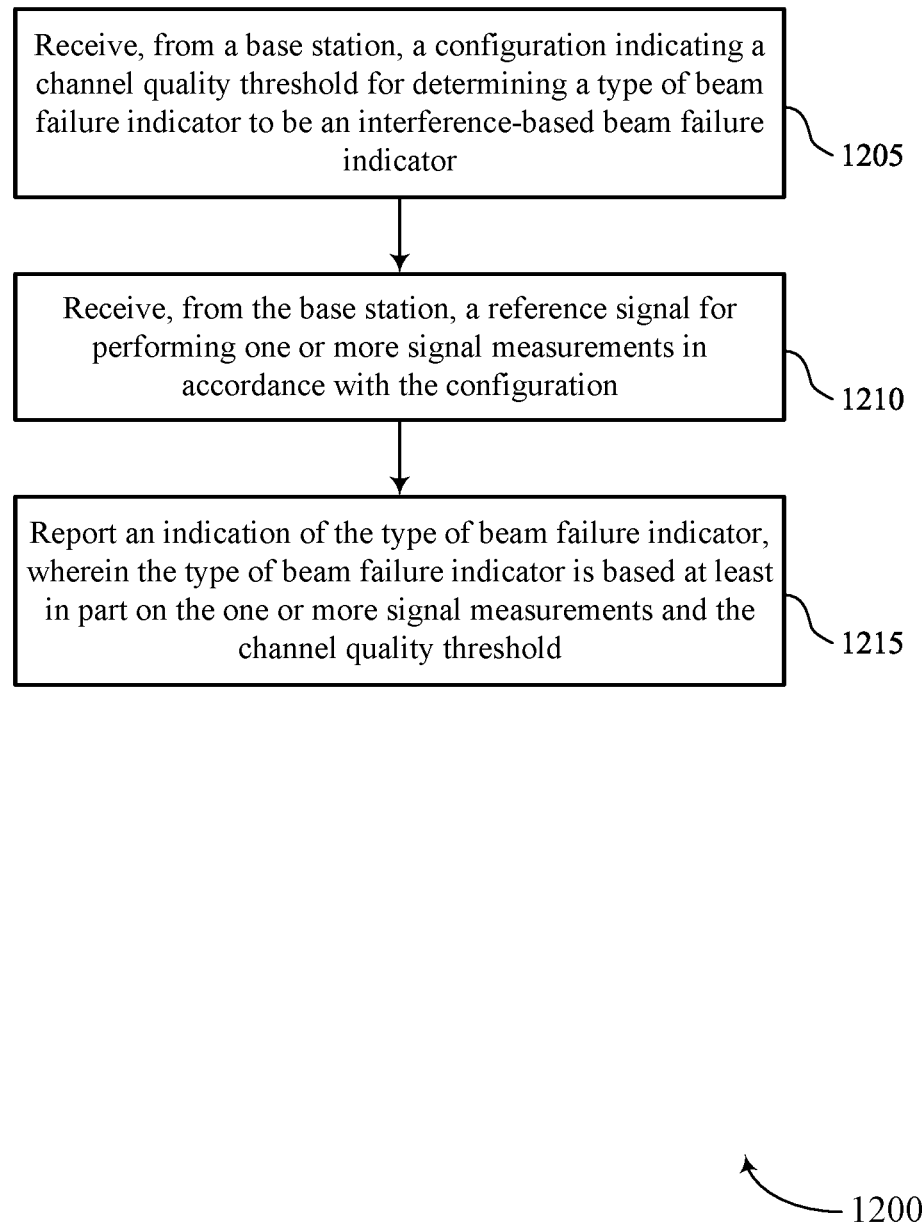
FIGS. 12 through 17 show flowcharts illustrating methods that support lower layer BFIs for wireless communications in accordance with aspects of the present disclosure.

FIG. 12 shows a flowchart illustrating a method 1200 that supports lower layer BFIs for wireless communications in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a configuration indicating a channel quality threshold for determining a type of BFI to be an interference-based BFI. The operations of 1205 may be performed in accordance with examples as disclosed herein. In some examples, aspects of the operations of 1205 may be performed by a channel quality threshold receive component 625 as described with reference to FIG. 6.

At 1210, the method may include receiving, from the base station, a reference signal for performing one or more signal measurements in accordance with the configuration. The operations of 1210 may be performed in accordance with examples as disclosed herein. In some examples, aspects of the operations of 1210 may be performed by an RS receive component 630 as described with reference to FIG. 6.

At 1215, the method may include reporting an indication of the type of BFI, where the type of BFI is based on the one or more signal measurements and the channel quality threshold. The operations of 1215 may be performed in accordance with examples as disclosed herein. In some examples, aspects of the operations of 1215 may be performed by a BFI reporting component 635 as described with reference to FIG. 6.

Figure 13:
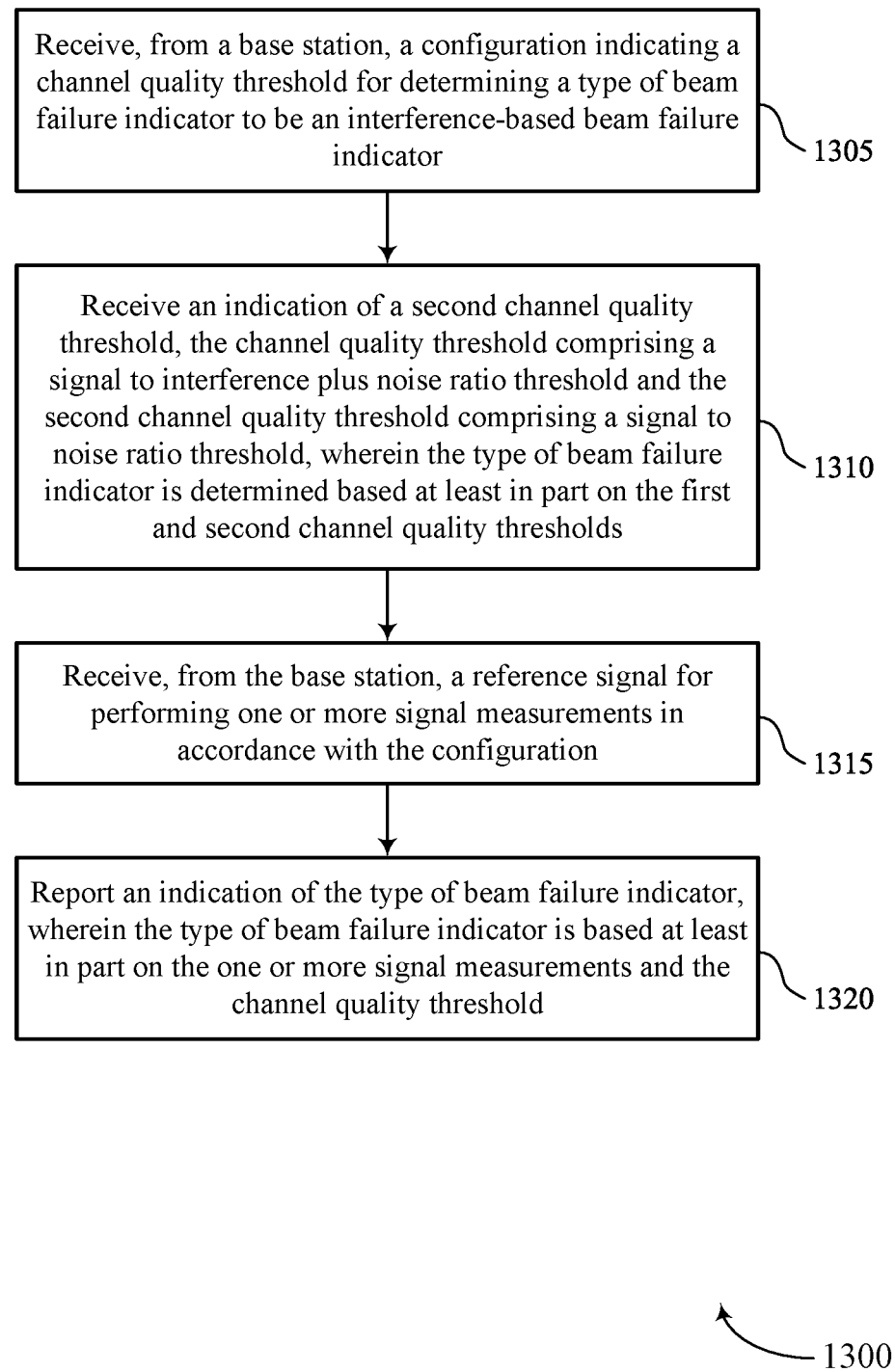

FIG. 13 shows a flowchart illustrating a method 1300 that supports lower layer BFIs for wireless communications in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a configuration indicating a channel quality threshold for determining a type of BFI to be an interference-based BFI. The operations of 1305 may be performed in accordance with examples as disclosed herein. In some examples, aspects of the operations of 1305 may be performed by a channel quality threshold receive component 625 as described with reference to FIG. 6.

At 1310, the method may include receiving an indication of a second channel quality threshold, the channel quality threshold including a SINR threshold and the second channel quality threshold including a SNR threshold, where the type of BFI is determined based on the first and second channel quality thresholds. The operations of 1310 may be performed in accordance with examples as disclosed herein. In some examples, aspects of the operations of 1310 may be performed by a channel quality threshold receive component 625 as described with reference to FIG. 6.

At 1315, the method may include receiving, from the base station, a reference signal for performing one or more signal measurements in accordance with the configuration. The operations of 1315 may be performed in accordance with examples as disclosed herein. In some examples, aspects of the operations of 1315 may be performed by an RS receive component 630 as described with reference to FIG. 6.

At 1320, the method may include reporting an indication of the type of BFI, where the type of BFI is based on the one or more signal measurements and the channel quality threshold. The operations of 1320 may be performed in accordance with examples as disclosed herein. In some examples, aspects of the operations of 1320 may be performed by a BFI reporting component 635 as described with reference to FIG. 6.

Figure 14:
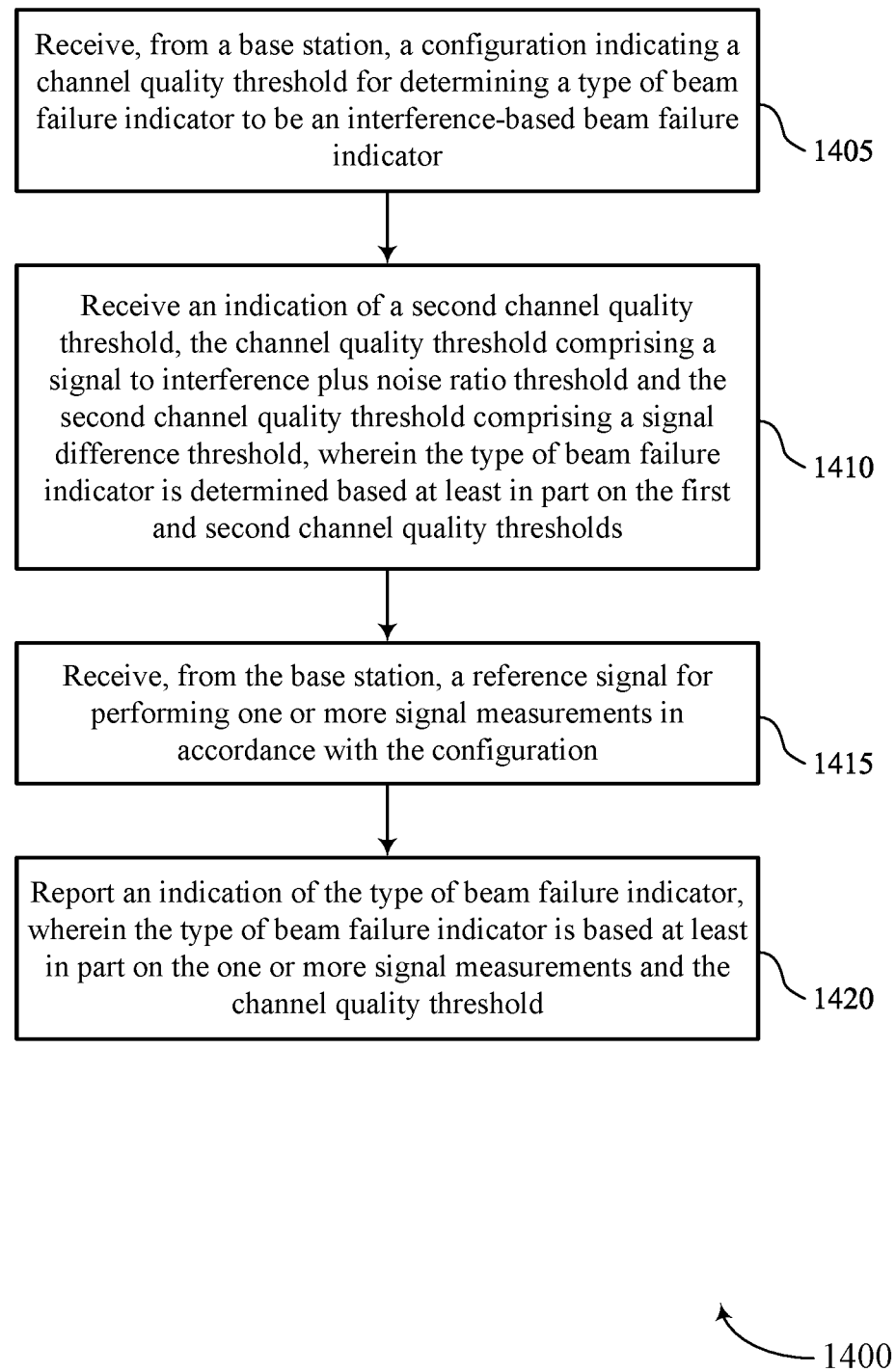

FIG. 14 shows a flowchart illustrating a method 1400 that supports lower layer BFIs for wireless communications in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a configuration indicating a channel quality threshold for determining a type of BFI to be an interference-based BFI. The operations of 1405 may be performed in accordance with examples as disclosed herein. In some examples, aspects of the operations of 1405 may be performed by a channel quality threshold receive component 625 as described with reference to FIG. 6.

At 1410, the method may include receiving an indication of a second channel quality threshold, the channel quality threshold including a SINR threshold and the second channel quality threshold including a signal difference threshold, where the type of BFI is determined based on the first and second channel quality thresholds. The operations of 1410 may be performed in accordance with examples as disclosed herein. In some examples, aspects of the operations of 1410 may be performed by a channel quality threshold receive component 625 as described with reference to FIG. 6.

At 1415, the method may include receiving, from the base station, a reference signal for performing one or more signal measurements in accordance with the configuration. The operations of 1415 may be performed in accordance with examples as disclosed herein. In some examples, aspects of the operations of 1415 may be performed by an RS receive component 630 as described with reference to FIG. 6.

At 1420, the method may include reporting an indication of the type of BFI, where the type of BFI is based on the one or more signal measurements and the channel quality threshold. The operations of 1420 may be performed in accordance with examples as disclosed herein. In some examples, aspects of the operations of 1420 may be performed by a BFI reporting component 635 as described with reference to FIG. 6.

Figure 15:
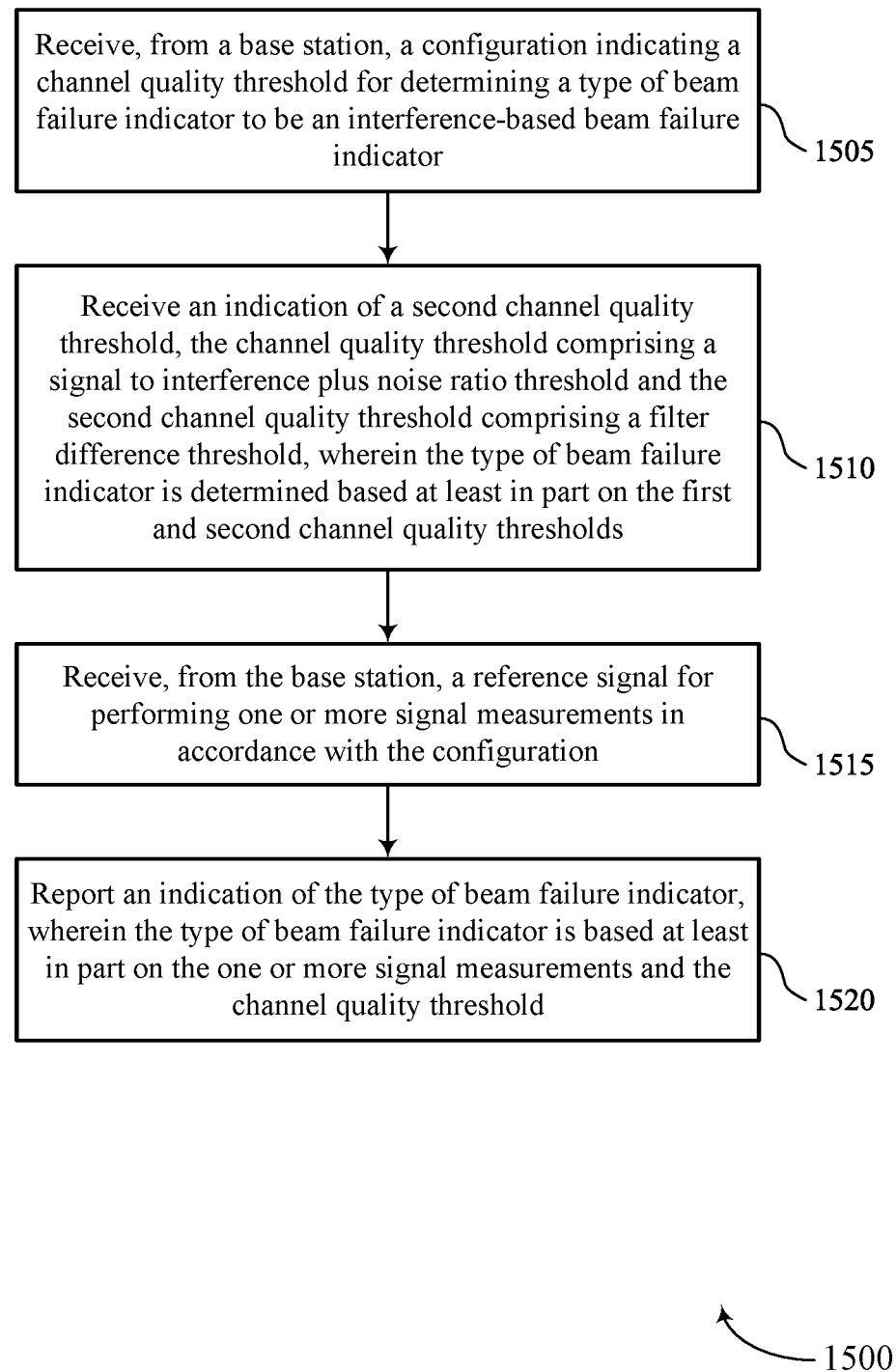

FIG. 15 shows a flowchart illustrating a method 1500 that supports lower layer BFIs for wireless communications in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a configuration indicating a channel quality threshold for determining a type of BFI to be an interference-based BFI. The operations of 1505 may be performed in accordance with examples as disclosed herein. In some examples, aspects of the operations of 1505 may be performed by a channel quality threshold receive component 625 as described with reference to FIG. 6.

At 1510, the method may include receiving an indication of a second channel quality threshold, the channel quality threshold including a SINR threshold and the second channel quality threshold including a filter difference threshold, where the type of BFI is determined based on the first and second channel quality thresholds. The operations of 1510 may be performed in accordance with examples as disclosed herein. In some examples, aspects of the operations of 1510 may be performed by a channel quality threshold receive component 625 as described with reference to FIG. 6.

At 1515, the method may include receiving, from the base station, a reference signal for performing one or more signal measurements in accordance with the configuration. The operations of 1515 may be performed in accordance with examples as disclosed herein. In some examples, aspects of the operations of 1515 may be performed by an RS receive component 630 as described with reference to FIG. 6.

At 1520, the method may include reporting an indication of the type of BFI, where the type of BFI is based on the one or more signal measurements and the channel quality threshold. The operations of 1520 may be performed in accordance with examples as disclosed herein. In some examples, aspects of the operations of 1520 may be performed by a BFI reporting component 635 as described with reference to FIG. 6.

Figure 16:
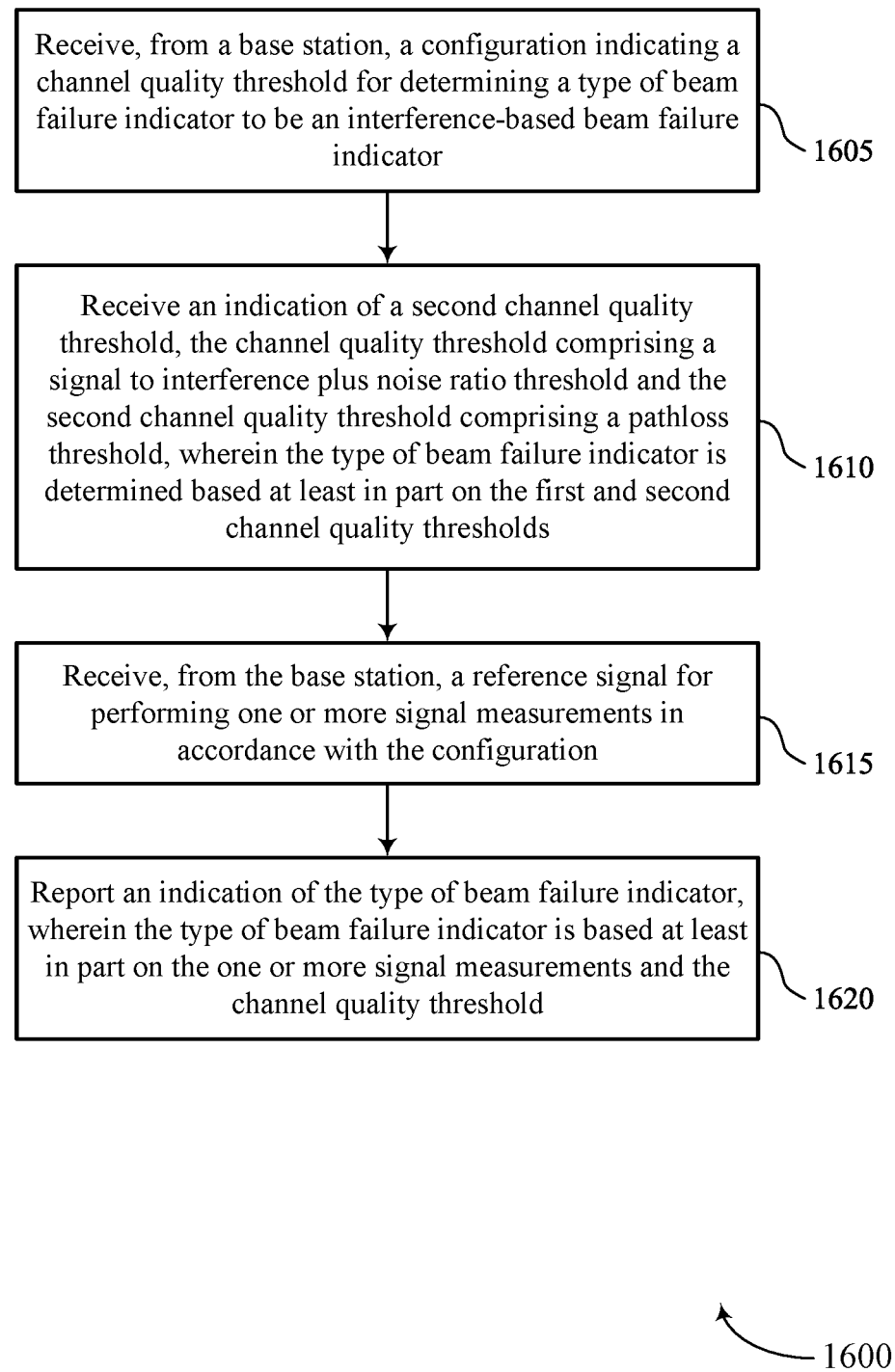

FIG. 16 shows a flowchart illustrating a method 1600 that supports lower layer BFIs for wireless communications in accordance with aspects of the present disclosure. The operations of the method 1600 may be implemented by a UE or its components as described herein. For example, the operations of the method 1600 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a configuration indicating a channel quality threshold for determining a type of BFI to be an interference-based BFI. The operations of 1605 may be performed in accordance with examples as disclosed herein. In some examples, aspects of the operations of 1605 may be performed by a channel quality threshold receive component 625 as described with reference to FIG. 6.

At 1610, the method may include receiving an indication of a second channel quality threshold, the channel quality threshold including a SINR threshold and the second channel quality threshold including a pathloss threshold, where the type of BFI is determined based on the first and second channel quality thresholds. The operations of 1610 may be performed in accordance with examples as disclosed herein. In some examples, aspects of the operations of 1610 may be performed by a channel quality threshold receive component 625 as described with reference to FIG. 6.

At 1615, the method may include receiving, from the base station, a reference signal for performing one or more signal measurements in accordance with the configuration. The operations of 1615 may be performed in accordance with examples as disclosed herein. In some examples, aspects of the operations of 1615 may be performed by an RS receive component 630 as described with reference to FIG. 6.

At 1620, the method may include reporting an indication of the type of BFI, where the type of BFI is based on the one or more signal measurements and the channel quality threshold. The operations of 1620 may be performed in accordance with examples as disclosed herein. In some examples, aspects of the operations of 1620 may be performed by a BFI reporting component 635 as described with reference to FIG. 6.

Figure 17:
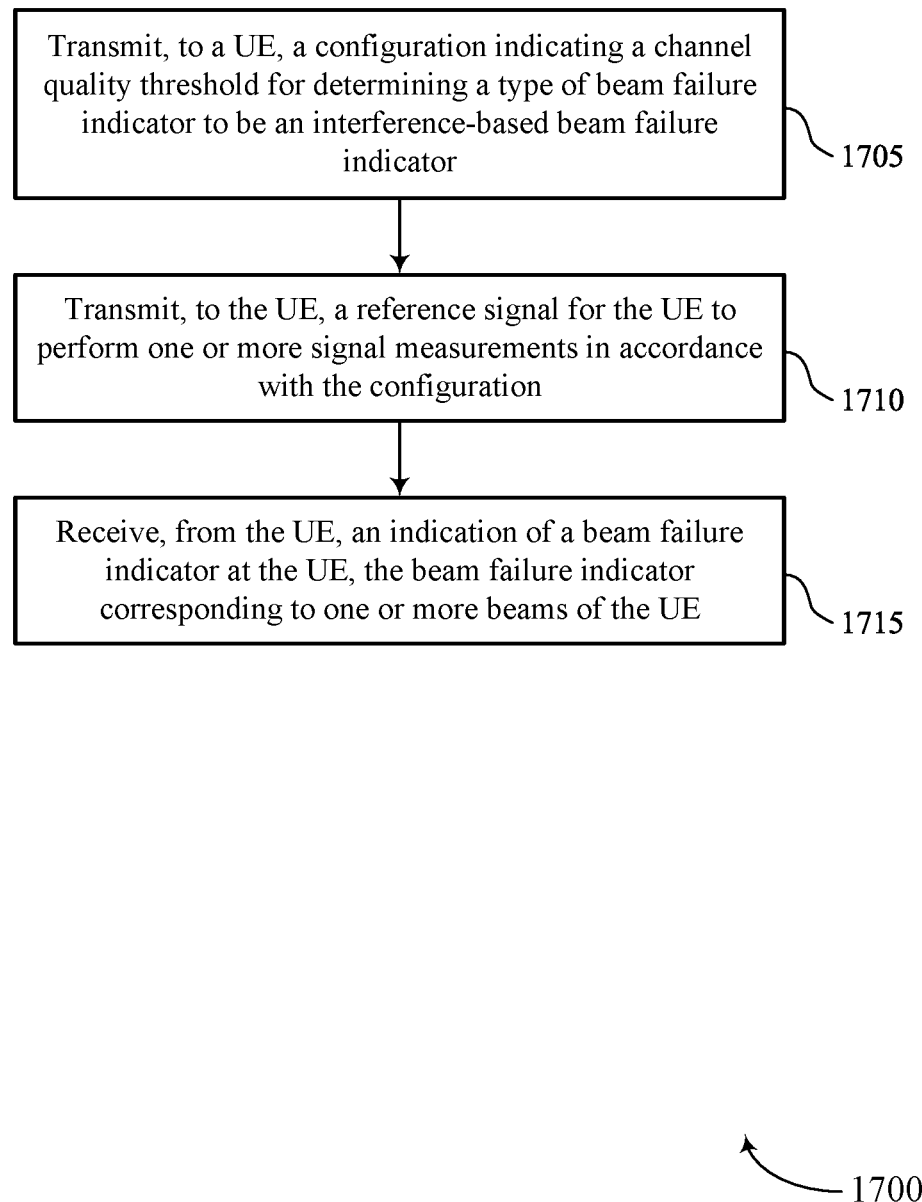

FIG. 17 shows a flowchart illustrating a method 1700 that supports lower layer BFIs for wireless communications in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a configuration indicating a channel quality threshold for determining a type of BFI to be an interference-based BFI. The operations of 1705 may be performed in accordance with examples as disclosed herein. In some examples, aspects of the operations of 1705 may be performed by a channel quality threshold transmission component 1025 as described with reference to FIG. 10.

At 1710, the method may include transmitting, to the UE, a reference signal for the UE to perform one or more signal measurements in accordance with the configuration. The operations of 1710 may be performed in accordance with examples as disclosed herein. In some examples, aspects of the operations of 1710 may be performed by an RS transmission component 1030 as described with reference to FIG. 10.

At 1715, the method may include receiving, from the UE, an indication of a BFI at the UE, the BFI corresponding to one or more beams of the UE. The operations of 1715 may be performed in accordance with examples as disclosed herein. In some examples, aspects of the operations of 1715 may be performed by a BFI receive component 1035 as described with reference to FIG. 10.

The following provides an overview of aspects of the present disclosure:

Aspect 1: A method for wireless communications at a UE, comprising: receiving, from a base station, a configuration indicating a channel quality threshold for determining a type of BFI to be an interference-based BFI; receiving, from the base station, a reference signal for performing one or more signal measurements in accordance with the configuration; and reporting an indication of the type of BFI, wherein the type of BFI is based at least in part on the one or more signal measurements and the channel quality threshold.

Aspect 2: The method of aspect 1, further comprising: receiving an indication of a second channel quality threshold, the channel quality threshold comprising a SINR threshold and the second channel quality threshold comprising a SNR threshold, wherein the type of BFI is determined based at least in part on the first and second channel quality thresholds.

Aspect 3: The method of aspect 2, wherein the one or more signal measurements comprises a SINR measurement of the reference signal and a SNR measurement of the reference signal, the method further comprising: determining that the BFI is the interference-based BFI based at least in part on the SINR measurement of the reference signal being less than the SINR threshold and the SNR measurement of the reference signal being greater than the SNR threshold; and determining that the BFI is a channel-based BFI based at least in part on the SINR measurement of the reference signal being less than the SINR threshold and the SNR measurement of the reference signal being less than the SNR threshold.

Aspect 4: The method of any of aspects 1 through 3, further comprising: receiving an indication of a second channel quality threshold, the channel quality threshold comprising a SINR threshold and the second channel quality threshold comprising a signal difference threshold, wherein the type of BFI is determined based at least in part on the first and second channel quality thresholds.

Aspect 5: The method of aspect 4, wherein the one or more signal measurements comprises a SINR measurement of the reference signal and a SNR measurement of the reference signal, the method further comprising: determining that the BFI is the interference-based BFI based at least in part on the SINR measurement of the reference signal being less than the SINR threshold and a difference between the SINR measurement of the reference signal and the SNR measurement of the reference signal being greater than the signal difference threshold; and determining that the BFI is a channel-based BFI based at least in part on the SINR measurement of the reference signal being less than the SINR threshold and the difference between the SINR measurement of the reference signal and the SNR measurement of the reference signal being less than the signal difference threshold.

Aspect 6: The method of any of aspects 1 through 5, further comprising: receiving an indication of a second channel quality threshold, the channel quality threshold comprising a SINR threshold and the second channel quality threshold comprising a filter difference threshold, wherein the type of BFI is determined based at least in part on the first and second channel quality thresholds.

Aspect 7: The method of aspect 6, wherein the one or more signal measurements comprises a SINR measurement of the reference signal and an average SINR measurement of the reference signal, the method further comprising: determining that the BFI is the interference-based BFI based at least in part on the SINR measurement of the reference signal being less than the SINR threshold and a difference between the SINR measurement of the reference signal and the average SINR measurement of the reference signal being greater than the filter difference threshold; and determining that the BFI is a channel-based BFI based at least in part on the SINR measurement of the reference signal being less than the SINR threshold and the difference between the SINR measurement of the reference signal and the average SINR measurement of the reference signal being less than the filter difference threshold.

Aspect 8: The method of any of aspects 1 through 7, further comprising: receiving an indication of a second channel quality threshold, the channel quality threshold comprising a SINR threshold and the second channel quality threshold comprising a pathloss threshold, wherein the type of BFI is determined based at least in part on the first and second channel quality thresholds.

Aspect 9: The method of aspect 8, wherein the one or more signal measurements comprises a SINR measurement of the reference signal and a pathloss of the reference signal, the method further comprising: determining that the BFI is the interference-based BFI based at least in part on the SINR measurement of the reference signal being less than the SINR threshold and the pathloss of the reference signal being less than the pathloss threshold; and determining that the BFI is a channel-based BFI based at least in part on the SINR measurement of the reference signal being less than the SINR threshold and the pathloss of the reference signal greater less than the pathloss threshold.

Aspect 10: The method of aspect 9, wherein the pathloss of the reference signal is indicated by a reference signal received power (RSRP) measurement or a channel quality indicator (CQI) report.

Aspect 11: The method of any of aspects 1 through 10, wherein receiving the reference signal comprises: receiving a beam failure detection reference signal from the base station.

Aspect 12: The method of aspect 11, wherein the beam failure detection reference signal is specific to one of the interference-based BFI or the channel-based BFI.

Aspect 13: The method of any of aspects 11 through 12, wherein the beam failure detection reference signal instructs the UE to measure one or more parameters for determining one of the interference-based BFI or the channel-based BFI.

Aspect 14: The method of any of aspects 1 through 13, further comprising: transmitting, to the base station, a report comprising a count of BFIs at the UE, the count of BFIs corresponding to a beam associated with the BFI or all beams configured for the UE.

Aspect 15: The method of aspect 14, wherein the report is transmitted via uplink control information or a medium access control MAC-CE.

Aspect 16: The method of any of aspects 1 through 15, wherein receiving the configuration comprises: receiving the configuration via an RRC message, downlink control information, a medium access control MAC-CE, or any combination thereof.

Aspect 17: A method for wireless communications at a base station, comprising: transmitting, to a UE, a configuration indicating a channel quality threshold for determining a type of BFI to be an interference-based BFI; transmitting, to the UE, a reference signal for the UE to perform one or more signal measurements in accordance with the configuration; and receiving, from the UE, an indication of a BFI at the UE, the BFI corresponding to one or more beams of the UE.

Aspect 18: The method of aspect 17, further comprising: transmitting an indication of a second channel quality threshold, the channel quality threshold comprising a SINR threshold and the second channel quality threshold comprising a SNR threshold, wherein the indication of the BFI at the UE is based at least in part on the first and second channel quality thresholds.

Aspect 19: The method of any of aspects 17 through 18, further comprising: transmitting an indication of a second channel quality threshold, the channel quality threshold comprising a SINR threshold and the second channel quality threshold comprising a signal difference threshold, wherein the indication of the BFI at the UE is based at least in part on the first and second channel quality thresholds.

Aspect 20: The method of any of aspects 17 through 19, further comprising: transmitting an indication of a second channel quality threshold, the channel quality threshold comprising a SINR threshold and the second channel quality threshold comprising a filter difference threshold, wherein the indication of the BFI at the UE is based at least in part on the first and second channel quality thresholds.

Aspect 21: The method of any of aspects 17 through 20, further comprising: transmitting an indication of a second channel quality threshold, the channel quality threshold comprising a SINR threshold and the second channel quality threshold comprising a pathloss threshold, wherein the indication of the BFI at the UE is based at least in part on the first and second channel quality thresholds.

Aspect 22: The method of any of aspects 17 through 21, wherein transmitting the reference signal comprises: transmitting a beam failure detection reference signal to the UE.

Aspect 23: The method of aspect 22, wherein the beam failure detection reference signal is specific to one of the interference-based BFI or a channel-based BFI.

Aspect 24: The method of any of aspects 22 through 23, wherein the beam failure detection reference signal instructs the UE to measure one or more parameters for determining the type of BFI to be one of the interference-based BFI or a channel-based BFI.

Aspect 25: The method of any of aspects 17 through 24, wherein receiving the indication of the BFI comprises: receiving, from the UE, a report comprising a count of BFIs at the UE, the count of BFIs corresponding to a beam associated with the BFI or all beams configured for the UE.

Aspect 26: The method of aspect 25, wherein the report is received via uplink control information or a medium access control MAC-CE.

Aspect 27: The method of any of aspects 17 through 26, wherein transmitting the configuration comprises: transmitting the configuration via an RRC message, downlink control information, a medium access control MAC-CE, or any combination thereof.

Aspect 28: An apparatus for wireless communications at a UE, comprising a processor; memory coupled with the processor; and instructions stored in the memory and executable by the processor to cause the apparatus to perform a method of any of aspects 1 through 16.

Aspect 29: An apparatus for wireless communications at a UE, comprising at least one means for performing a method of any of aspects 1 through 16.

Aspect 30: A non-transitory computer-readable medium storing code for wireless communications at a UE, the code comprising instructions executable by a processor to perform a method of any of aspects 1 through 16.

Aspect 31: An apparatus for wireless communications at a base station, comprising a processor; memory coupled with the processor; and instructions stored in the memory and executable by the processor to cause the apparatus to perform a method of any of aspects 17 through 27.

Aspect 32: An apparatus for wireless communications at a base station, comprising at least one means for performing a method of any of aspects 17 through 27.

Aspect 33: A non-transitory computer-readable medium storing code for wireless communications at a base station, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a configuration indicating a first channel quality threshold for determining a type of a beam failure indicator to be an interference-based beam failure indicator;
   receiving a reference signal for performing one or more signal measurements in accordance with the configuration; and
   reporting an indication of the type of the beam failure indicator, wherein the type of the beam failure indicator is based at least in part on the one or more signal measurements and the first channel quality threshold.

2. The method of claim 1, further comprising:
   receiving an indication of a second channel quality threshold, the first channel quality threshold comprising a signal to interference plus noise ratio threshold and the second channel quality threshold comprising a signal to noise ratio threshold, wherein the type of the beam failure indicator is determined based at least in part on the first channel quality threshold and the second channel quality threshold.

3. The method of claim 2, wherein the one or more signal measurements comprises a signal to interference plus noise ratio measurement of the reference signal and a signal to noise ratio measurement of the reference signal, the method further comprising:
   determining that the beam failure indicator is the interference-based beam failure indicator when the signal to interference plus noise ratio measurement of the reference signal is less than the signal to interference plus noise ratio threshold and when the signal to noise ratio measurement of the reference signal is greater than the signal to noise ratio threshold; and
   determining that the beam failure indicator is a channel-based beam failure indicator when the signal to interference plus noise ratio measurement of the reference signal is less than the signal to interference plus noise ratio threshold and when the signal to noise ratio measurement of the reference signal is less than the signal to noise ratio threshold.

4. The method of claim 1, further comprising:
   receiving an indication of a second channel quality threshold, the first channel quality threshold comprising a signal to interference plus noise ratio threshold and the second channel quality threshold comprising a signal difference threshold, wherein the type of the beam failure indicator is determined based at least in part on the first channel quality threshold and the second channel quality threshold.

5. The method of claim 4, wherein the one or more signal measurements comprises a signal to interference plus noise ratio measurement of the reference signal and a signal to noise ratio measurement of the reference signal, the method further comprising:
   determining that the beam failure indicator is the interference-based beam failure indicator when the signal to interference plus noise ratio measurement of the reference signal is less than the signal to interference plus noise ratio threshold and when a difference between the signal to interference plus noise ratio measurement of the reference signal and the signal to noise ratio measurement of the reference signal is greater than the signal difference threshold; and
   determining that the beam failure indicator is a channel-based beam failure indicator when the signal to interference plus noise ratio measurement of the reference signal is less than the signal to interference plus noise ratio threshold and when the difference between the signal to interference plus noise ratio measurement of the reference signal and the signal to noise ratio measurement of the reference signal is less than the signal difference threshold.

6. The method of claim 1, further comprising:
   receiving an indication of a second channel quality threshold, the first channel quality threshold comprising a signal to interference plus noise ratio threshold and the second channel quality threshold comprising a filter difference threshold, wherein the type of the beam failure indicator is determined based at least in part on the first channel quality threshold and the second channel quality threshold.

7. The method of claim 6, wherein the one or more signal measurements comprises a signal to interference plus noise ratio measurement of the reference signal and an average signal to interference plus noise ratio measurement of the reference signal, the method further comprising:
   determining that the beam failure indicator is the interference-based beam failure indicator when the signal to interference plus noise ratio measurement of the reference signal is less than the signal to interference plus noise ratio threshold and when a difference between the signal to interference plus noise ratio measurement of the reference signal and the average signal to interference plus noise ratio measurement of the reference signal is greater than the filter difference threshold; and
   determining that the beam failure indicator is a channel-based beam failure indicator when the signal to interference plus noise ratio measurement of the reference signal is less than the signal to interference plus noise ratio threshold and when the difference between the signal to interference plus noise ratio measurement of the reference signal and the average signal to interference plus noise ratio measurement of the reference signal is less than the filter difference threshold.

8. The method of claim 1, further comprising:
   receiving an indication of a second channel quality threshold, the first channel quality threshold comprising a signal to interference plus noise ratio threshold and the second channel quality threshold comprising a pathloss threshold, wherein the type of the beam failure indicator is determined based at least in part on the first channel quality threshold and the second channel quality threshold.

9. The method of claim 8, wherein the one or more signal measurements comprises a signal to interference plus noise ratio measurement of the reference signal and a pathloss of the reference signal, the method further comprising:

determining that the beam failure indicator is the interference-based beam failure indicator when the signal to interference plus noise ratio measurement of the reference signal being less than the signal to interference plus noise ratio threshold and when the pathloss of the reference signal is less than the pathloss threshold; and determining that the beam failure indicator is a channel-based beam failure indicator when the signal to interference plus noise ratio measurement of the reference signal is less than the signal to interference plus noise ratio threshold and when the pathloss of the reference signal greater less than the pathloss threshold.

10. The method of claim 9, wherein the pathloss of the reference signal is indicated by a reference signal received power (RSRP) measurement or a channel quality indicator (CQI) report.

11. The method of claim 1, wherein the receiving the reference signal comprises:

receiving a beam failure detection reference signal.

12. The method of claim 11, wherein the beam failure detection reference signal is specific to one of the interference-based beam failure indicator or a channel-based beam failure indicator.

13. The method of claim 11, wherein the beam failure detection reference signal instructs the UE to measure one or more parameters for determining one of the interference-based beam failure indicator or a channel-based beam failure indicator.

14. The method of claim 1, further comprising:

Transmitting a report comprising a count of beam failure indicators at the UE, the count of beam failure indicators corresponding to a beam associated with the beam failure indicator or all beams configured for the UE.

15. The method of claim 14, wherein the report is transmitted via uplink control information or a medium access control (MAC) control element (MAC-CE).

16. The method of claim 1, wherein the receiving the configuration comprises:

receiving the configuration via a radio resource control (RRC) message, downlink control information, a medium access control (MAC) control element (MAC-CE), or any combination thereof.

17. A method for wireless communications at a network device, comprising:

transmitting, to a user equipment (UE), a configuration indicating a first channel quality threshold corresponding to an interference-based beam failure indicator;

transmitting, to the UE, a reference signal configured for one or more signal measurements in accordance with the configuration;

receiving, from the UE, an indication of a beam failure indicator at the UE, the beam failure indicator corresponding to one or more beams of the UE; and transmitting an indication of a second channel quality threshold, the first channel quality threshold comprising a signal to interference plus noise ratio threshold and the second channel quality threshold, wherein the indication of the beam failure indicator at the UE is based at least in part on the first channel quality threshold and the second channel quality threshold.

18. The method of claim 17, wherein the second channel quality threshold comprises a signal to noise ratio threshold.

19. The method of claim 17, wherein the second channel quality threshold comprises a signal difference threshold.

20. The method of claim 17, wherein the second channel quality threshold comprises a filter difference threshold.

21. The method of claim 17, wherein the second channel quality threshold comprises a pathloss threshold.

22. The method of claim 17, wherein the transmitting the reference signal comprises:

transmitting a beam failure detection reference signal to the UE.

23. The method of claim 22, wherein the beam failure detection reference signal is specific to one of the interference-based beam failure indicator or a channel-based beam failure indicator.

24. The method of claim 22, wherein the beam failure detection reference signal instructs the UE to measure one or more parameters for determining a type of the beam failure indicator to be one of the interference-based beam failure indicator or a channel-based beam failure indicator.

25. The method of claim 17, wherein the receiving the indication of the beam failure indicator comprises:

receiving, from the UE, a report comprising a count of beam failure indicators at the UE, the count of beam failure indicators corresponding to a beam associated with the beam failure indicator or all beams configured for the UE.

26. The method of claim 25, wherein the report is received via uplink control information or a medium access control (MAC) control element (MAC-CE).

27. The method of claim 17, wherein the transmitting the configuration comprises:

transmitting the configuration via a radio resource control (RRC) message, downlink control information, a medium access control (MAC) control element (MAC-CE), or any combination thereof.

28. An apparatus for wireless communications at a user equipment (UE), comprising:

a processor;

memory coupled with the processor; and instructions stored in the memory and executable by the processor to cause the apparatus to:

receive a configuration indicating a first channel quality threshold corresponding to an interference-based beam failure indicator;

receive a reference signal to perform one or more signal measurements;

perform the one or more signal measurements in accordance with the configuration;

determine a type of a beam failure indicator based at least in part on the one or more signal measurements and the first channel quality threshold; and report an indication of the determined type of the beam failure indicator.

29. The apparatus of claim 28, wherein the instructions are further executable by the processor to cause the apparatus to:

receive an indication of a second channel quality threshold, the first channel quality threshold comprising a signal to interference plus noise ratio threshold and the second channel quality threshold comprising a signal to noise ratio threshold, wherein the type of the beam failure indicator is further determined based at least in part on the second channel quality threshold.

30. An apparatus for wireless communications at a network device, comprising:
a processor;
memory coupled with the processor; and
instructions stored in the memory and executable by the processor to cause the apparatus to:
transmit, to a user equipment (UE), a configuration indicating a first channel quality threshold that corresponds to an interference-based beam failure indicator;
transmit, to the UE, a reference signal;
receive, from the UE, an indication of a beam failure indicator at the UE, the beam failure indicator corresponding to one or more beams of the UE; and
transmit, to the UE, an indication of a second channel quality threshold, the first channel quality threshold comprising a signal to interference plus noise ratio threshold and the second channel quality threshold comprising signal to noise ratio threshold, wherein the indication of the beam failure indicator at the UE is based at least in part on the first channel quality threshold and the second channel quality threshold.

* * * * *